Aug. 26, 1958   C. W. MUSSER   2,848,814
ADJUSTABLE SUPPORT AND RELEASABLY INTERLOCKING
MEMBER SUPPORTED THEREBY
Filed Nov. 27, 1956   4 Sheets-Sheet 1
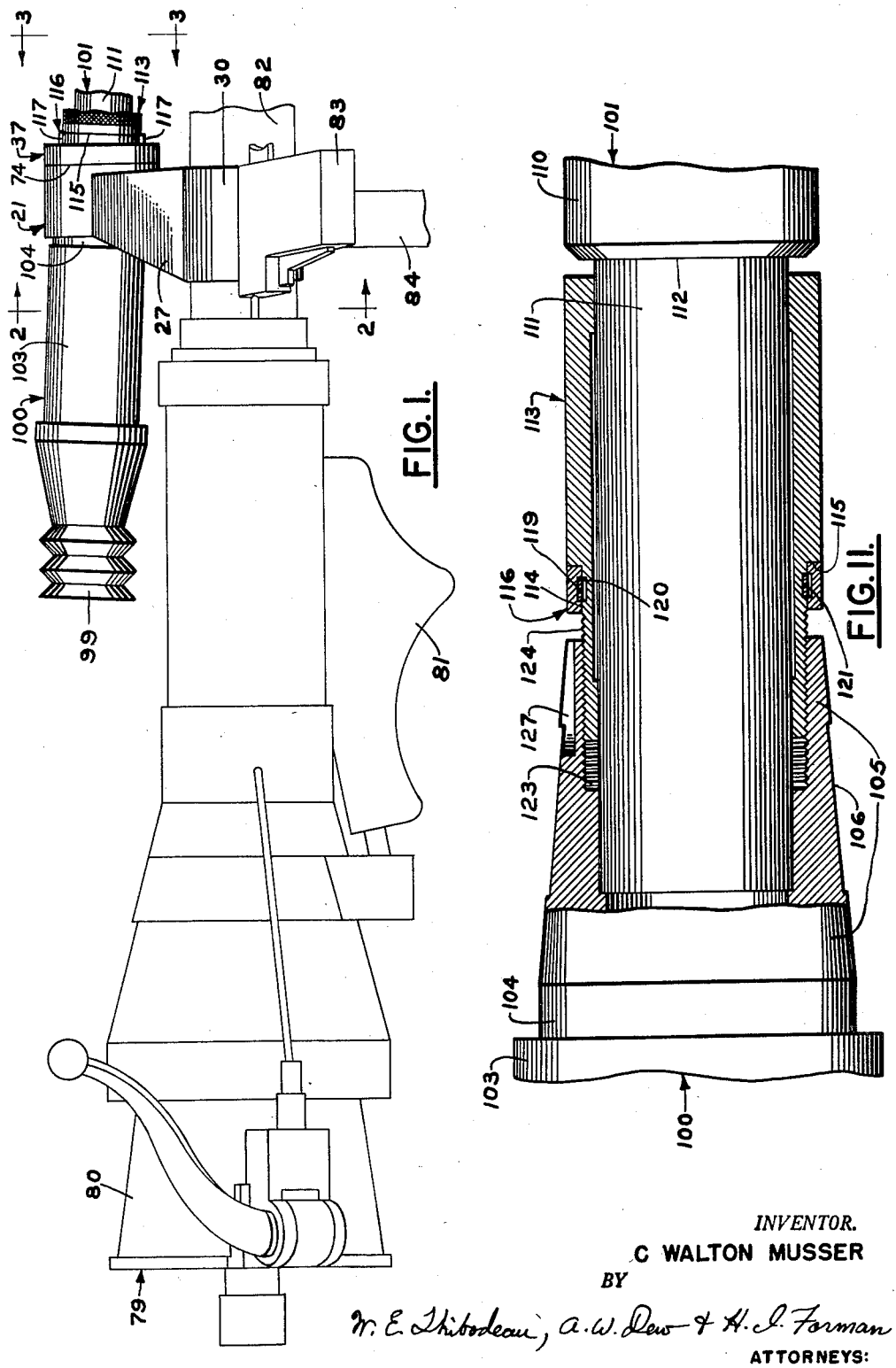
INVENTOR.
C WALTON MUSSER
BY
W. E. Thibodeau, A. W. Dew & H. J. Forman
ATTORNEYS:

Aug. 26, 1958 C. W. MUSSER 2,848,814
ADJUSTABLE SUPPORT AND RELEASABLY INTERLOCKING
MEMBER SUPPORTED THEREBY
Filed Nov. 27, 1956 4 Sheets-Sheet 2
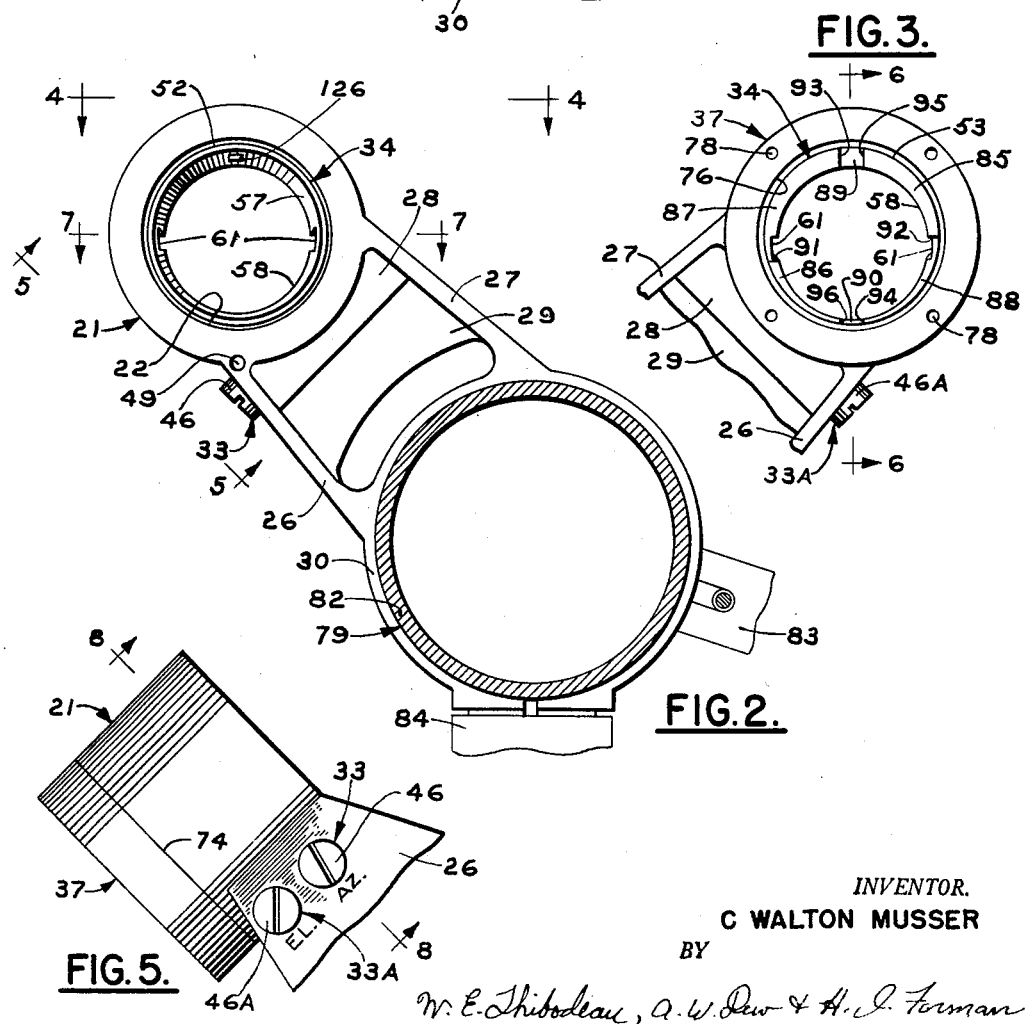
INVENTOR.
C WALTON MUSSER
BY
W. E. Thibodeau, A. W. Dew & H. J. Forman
ATTORNEYS:

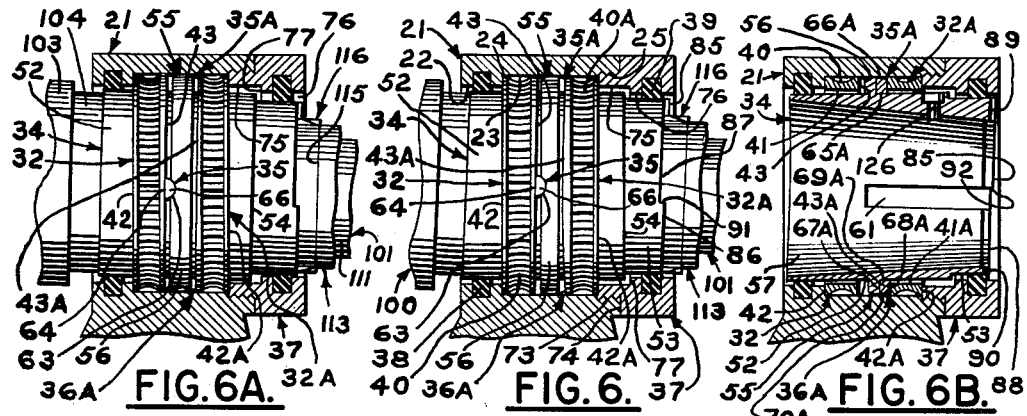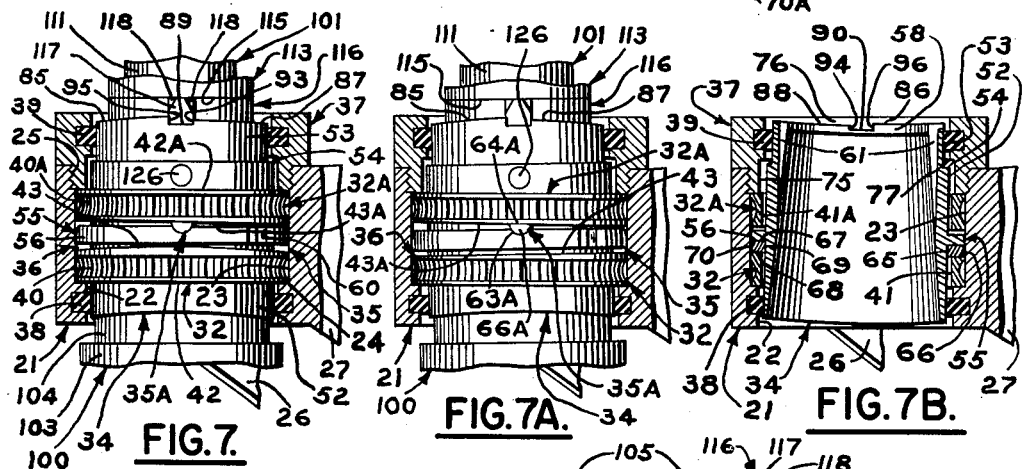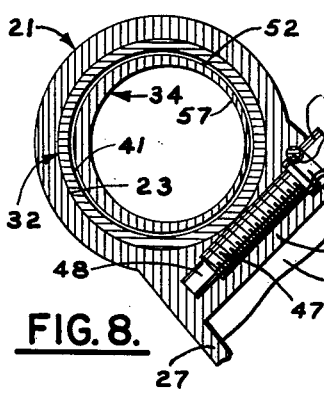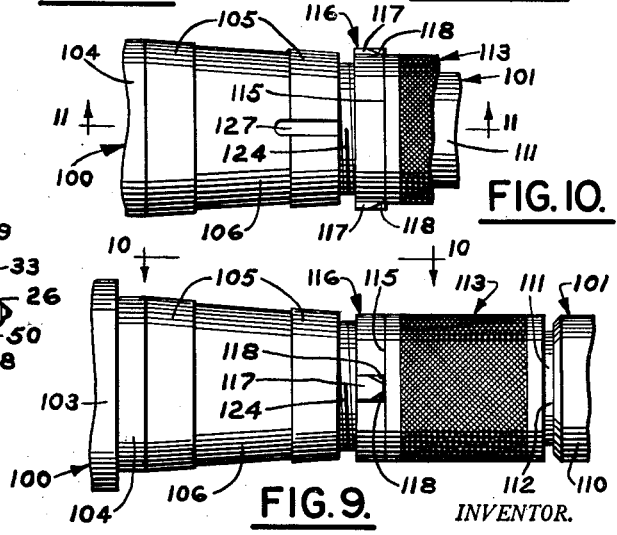

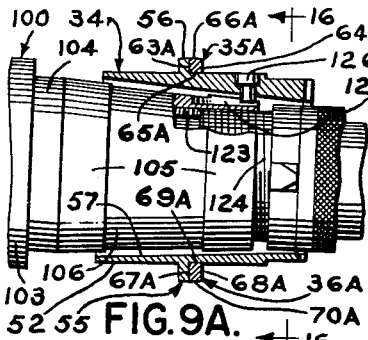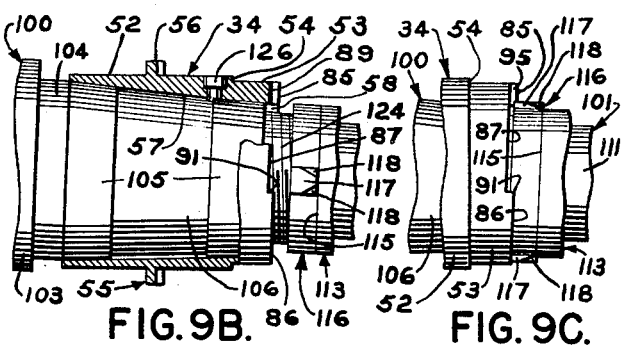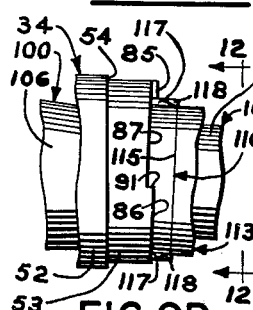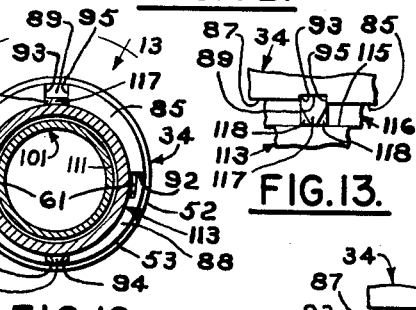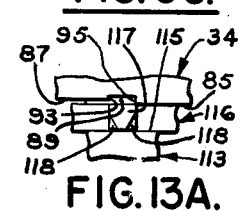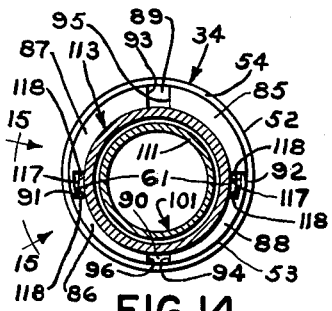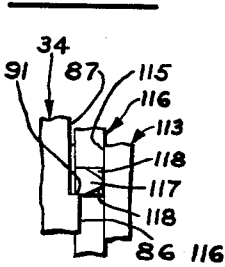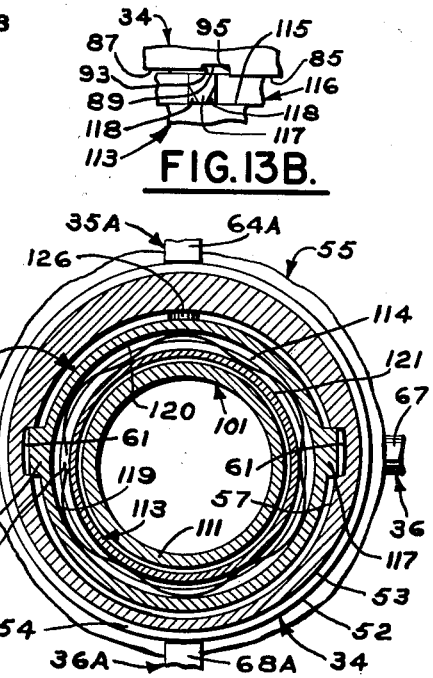

United States Patent Office 2,848,814
Patented Aug. 26, 1958

2,848,814

ADJUSTABLE SUPPORT AND RELEASABLY INTERLOCKING MEMBER SUPPORTED THEREBY

C Walton Musser, Beverly, Mass., assignor to the United States of America as represented by the Secretary of the Army Application November 27, 1956, Serial No. 624,707

13 Claims. (Cl. 33—50)

(Granted under Title 35, U. S. Code (1952), sec. 266)

The invention described herein may be manufactured and used by or for the Government for governmental purposes without the payment of any royalty thereon.

Broadly stated, my invention relates to supports and to objects supported thereby. The supports are of such type wherein the position of the object supported thereby is adjustable, but wherein the support and the object supported thereby are not necessarily releasably interlockable with each other; of such other type wherein the support and the object supported thereby are releasably interlockable with each other, but wherein the position of the object supported thereby is not necessarily adjustable; and of still such other type wherein the position of the object supported thereby is adjustable and wherein the support and the object supported thereby are releasably interlockable with each other. The objects supported are of such type as to be releasably interlockable with the supports.

In particular, although not limited solely thereto, my invention, in its most comprehensive aspects, pertains jointly to a support attachable to a firearm and to a sighting telescope, or other device, by which the firearm is aimed; the support being made so as to receive and to support the sighting telescope, being made so that the position of the telescope is accurately adjustable in two, imaginary, perpendicular planes (e. g., in azimuth and in elevation), and being made so as to be releasably interlockable with the telescope; and the telescope being made so as to fit into and to be supported by the support, and so as to be releasably interlockable with the support.

In practicing my invention I provide a gimbal tube which is accommodated in a housing, which housing is attachable to a firearm. The gimbal tube is made so as to receive and to support the sighting telescope, and so as to be releasably interlockable with the telescope. Furthermore, the position of the gimbal tube is selectively adjustable in two, imaginary, perpendicular planes which pass through that tube's axis; such adjustment being effected by rotatable, wedge-shaped adjusting rings which are also accommodated in the housing and which encircle the gimbal tube. The telescope fits into and is supported by the gimbal tube and, in addition, is made so as to be releasably interlockable with the gimbal tube. Therefore, as the position of the gimbal tube is adjusted, the position of the telescope is adjusted accordingly.

One object of my invention is to provide a simply constructed, rugged and durable support.

Another object is to provide a support in which the position of the object supported thereby is adjustable in two, imaginary planes which are substantially perpendicular to each other, but in which the support and the object supported thereby need not necessarily be releasably interlockable with each other;

Still another object is to provide a support in which the object supported thereby is releasably interlockable with the support, but in which the position of the object supported need not necessarily be adjustable as stated.

Yet another object is to provide a support in which the position of the object supported thereby is adjustable, as stated, and in which the object supported is releasably interlockable with the support.

An additional object is to provide a support in which the means for adjusting the position of the object supported is self-locking.

A further object is to provide an object to be supported, which object is made so as to releasably interlock with the support.

A still further object is to provide the combination of a support and of an object supported thereby; the support being made so as to be releasably interlockable with the object supported, and the object supported being made so as to be releasably interlockable with the support.

A yet further object is to provide the combination of a support and of an object supported thereby; the support being made so as to be releasably interlockable with the object supported and so that the position of the object supported is adjustable, and the supported object being made so as to be releasably interlockable with the support.

The foregoing and other objects of my invention will become apparent from the following description and the accompanying drawings which, respectively, describe and show, for illustrative purposes only, one preferred embodiment of my invention as applied to a recoilless rifle and used as a support for the rifle's sighting telescope; the support being made so that the position of the telescope is adjustable in two imaginary planes which are substantially perpendicular to each other (e. g., in azimuth and in elevation), the support also being made so as to be releasably interlockable with the sighting telescope, and the named telescope being made so as to be releasably interlockable with the support. In the drawings:

Fig. 1 is a side view of the rear portion of a representative recoilless rifle (i. e., that portion including the rifle's breech and certain other parts) showing the support in position on the rifle, and showing a portion of a representative sighting telescope positioned in the support and used, in known manner, in aiming the rifle; the rifle portion and the certain parts thereof being shown in comparatively thin lines, and the support and the telescope portion being shown in prominent lines.

Fig. 2 is a view, taken along line 2—2 of Fig. 1 and looking from the rifle's breech end, showing the position of the support relative to the rifle's barrel, which support and barrel are drawn in prominent lines; and showing the position of the support relative to certain of the rifle's parts, which parts are drawn in comparatively thin lines and are broken off. For convenience, the sighting telescope has been removed from the support.

Fig. 3 is a view, taken along ling 3—3 of Fig. 1 and looking from the rifle's breech and, showing the position details of the support. For convenience, the sighting telescope normally positioned in the support is not shown.

Fig. 4 is a view, taken along line 4—4 of Fig. 2, showing a portion of the rifle's barrel and a portion of the support, as seen upon looking down from above. To expose to view a portion of certain of the support's components, which are positioned inside the support and which would not otherwise be visible in this figure, portions of other components are partly broken away and partly sectioned.

Fig. 5 is a view, taken along line 5—5 of Fig. 2, showing more details of the support.

Fig. 6 is a cross-section, taken along line 6—6 of Fig. 3 and looking in the direction indicated, showing the support in one position of adjustment in elevation. For illustrative purposes, a portion of the rifle's sighting telescope is shown in the support, which telescope is also in one position of adjustment in elevation.

Fig. 6A is similar to Fig. 6, except that the support and the sighting telescope are shown in another position of adjustment in elevation.

Fig. 6B is similar to Figs. 6 and 6A, except that the telescope portion has been removed from Fig. 6B, some of the support's components, seen from the outside thereof in Figs. 6 and 6A, are shown in cross-section in Fig. 6B, and the support is shown in still another position of adjustment in elevation.

Fig. 7 is a cross-section, taken along line 7—7 of Fig. 2 and looking in the direction indicated, showing the support in one position of adjustment in azimuth. For illustrative purposes, a portion of the rifle's sighting telescope is shown in the support, which telescope is also in one position of adjustment in azimuth.

Fig. 7A is similar to Fig. 7, except that the support and the sighting telescope are shown in another position of adjustment in azimuth.

Fig. 7B is similar to Figs. 7 and 7A, except that the telescope portion has been removed from Fig. 7B, some of the support's components, seen from the outside in Figs. 7 and 7A, are shown in cross-section in Fig. 7B, and the support is shown in still another position of adjustment in azimuth.

Fig. 8 is a cross-section, taken along lines 8—8 of Fig. 5, showing additional details of the support.

Fig. 9 is a view of that portion of the sighting telescope which fits into the support and which contains means for releasably interlocking with the support.

Fig. 9A is similar to Fig. 9 except that a portion of the telescope has been broken and another portion sectioned; and, additionally, the telescope is shown partially inserted into the support's gimbal tube, which tube is shown in cross-section the same as in Fig. 6B.

Fig. 9B, in essence, is similar to Fig. 9A, except that a portion of the right end of the gimbal tube is shown as seen from the outside and the telescope is seated in the gimbal tube.

Fig. 9C is similar to Fig. 9B, except that certain of the telescope's components have been rotated from the position shown in Fig. 9B until locking projections on one of those components abut a certain portion of the support's gimbal tube, thereby partially releasably interlocking the telescope and the support.

Fig. 9D is similar to Fig. 9C except the telescope's locking projections have been displaced toward the left from the position shown in Fig. 9C so that the telescope and the support are fully, releasably interlocked together.

Fig. 10 is a view, taken along line 10—10 of Fig. 9, showing additional details of the telescope.

Fig. 11 is a cross-section, taken along line 11—11 of Fig. 10 and looking in the direction indicated, showing more details of the telescope.

Fig. 12 is a view, taken along line 12—12 of Fig. 9D, showing other details relating to the telescope and to the support's gimbal tube.

Fig. 13 is a view, taken along line 13—13 of Fig. 12 and looking in the direction there indicated, showing one of the telescope's locking projections releasably interlocked with the support's gimbal tube.

Fig. 13A is similar to Fig. 13, except that the telescope's locking projection is shown in a different position from that shown in Fig. 13.

Fig. 13B is similar to Figs. 13 and 13A, except that the telescope's locking projection is shown in a different position from those shown in Figs. 13 and 13A.

Fig. 14 is similar to Fig. 12, except that the telescope's locking projections are in a different position from that shown in Fig. 12.

Fig. 15 is a view, taken along line 15—15 of Fig. 14 and looking in the direction indicated, showing a certain relationship existing between one of the telescope's locking projections and part of the support's gimbal tube.

Fig. 16 is a cross-section, taken along line 16—16 of Fig. 9A and looking in the direction indicated, showing additional details relating to the telescope and to the support's gimbal tube.

In describing my invention, in terms of the earlier named preferred embodiment, it seems expedient to describe the construction of the support proper, to explain briefly how the position of the support's gimbal tube is adjusted whenever necessary, to explain the attachment of the support to the recoilless rifle, to describe the provision for releasably interlocking the support and the rifle's sighting telescope, and to explain the operation of the invention. Therefore, for convenience of explanation, the illustrative embodiment of my invention will be described under appropriate headings and sub-headings which pertain to the just-named and to other pertinent matters.

CONSTRUCTION OF THE SUPPORT

Housing

In describing the construction of the support, it seems expedient to begin with the housing 21 (Figs. 1, 2 and 4 through 8). This housing 21 is a tube-like member having a stepped, cylindrical opening extending from end to end of the housing; which opening consists of a portion 22 (Figs. 2, 6, 7 and 7B) at one end of the housing, a somewhat larger diametered portion 23 (Figs. 6, 7, 7B and 8) adjacent to portion 22 and joined thereto by an annular shoulder 24 (Figs. 6 and 7), and a threaded portion 25 (Figs. 6 and 7) adjacent to portion 23 and extending to the housing's other end. For reasons which will become evident as the description proceeds, the smaller diameter of the just-named threaded portion is larger than the diameter of portion 23.

Projecting from the exterior, lateral surface of housing 21 and integral therewith are the arms 26 and 27 (Figs. 2 through 4, 7, 7B and 8) which are spaced from each other as best shown in Figs. 2 through 4 and 8. Also projecting from the housing's exterior, lateral surface and extending between arms 26 and 27 is a lug 28 (Figs. 2, 3 and 8); the arms and the lug being joined by a web 29 in usual manner. At their ends distal to housing 21, arms 26 and 27 become integral with the exterior, lateral surface of a tubular band 30 (Figs. 1, 2 and 4); the axis of the band being substantially parallel to and conveniently spaced from the axis of housing 21, as can easily be understood from the last-named figures.

Contained in assembled relationship, later to be explained, inside housing 21 are the adjusting rings 32 and 32A (Figs. 4 and 6 through 7B), the adjusting worms 33 and 33A (Fig. 5), a gimbal tube 34 (Figs. 2, 3, 4, 6 through 8, 9A through 9D, 12, 14, and 16), shoes 35 and 36 (one of which is shown in Figs. 4, 6 and 6A, both of which shoes are shown in Figs. 7 and 7A), and shoes 35A and 36A (one of which is shown in Figs. 4, 7 and 7A, both of which shoes are shown in Figs. 6 through 6B and 9).

Joined to housing 21, for the purpose of retaining the just-named adjusting rings, gimbal tube and shoes in assembled relationship to each other within the housing, is a cap ring 37 (Figs. 1, 3 through 7 and 7B).

Between the outside of gimbal tube 34 and housing 21 is a sealing ring 38 (Figs. 4, 6, 7 and 7B); and, similarly, between the outside of the gimbal tube and cap ring 37 is a sealing ring 39.

Adjusting rings

Adjusting rings 32 and 32A (Figs. 4 and 6 through 7B) are substantially identical to each other. For that reason, a description of one adjusting ring will suffice for both. For convenience, adjusting ring 32 will be described presently and certain portions of that ring will be identified.

Later it will be explained that adjusting ring 32 is used to adjust the position of gimbal tube 34 in one plane in housing 21, which plane passes through the gimbal tube's axis; and that adjusting ring 32A is used to adjust the position of the gimbal tube in another plane in housing 21, which plane also passes through the gimbal tube's axis and which plane, further, is substantially perpendicular to the plane in which the position of the gimbal tube is adjusted by use of the first-named adjusting ring.

Adjusting ring 32 has a cylindrical, exterior, lateral or circumferential surface, in which surface the worm gear teeth 40 (Figs. 6, 6B and 7) are formed; and adjusting ring 32 also has a cylindrical, interior, lateral surface 41 (Figs. 6B and 7B), which surface forms the ring's axially extending opening and is concentric to the ring's exterior lateral or circumferential surface.

Additionally, one end face 42 (Figs. 6 through 6B) of adjusting ring 32 is substantially perpendicular to that ring's axis and, therefore, perpendicular to that ring's exterior and interior lateral surfaces; but the other end face 43 (Figs. 6, 6A, 7 and 7A) of the named adjusting ring is inclined somewhat with respect to that ring's axis and, therefore, is inclined with respect to that ring's exterior and interior lateral surfaces, and is inclined with respect to that ring's end face 42.

In the present embodiment, the amount of inclination between end faces 42 and 43 is in the order of one (1) degree. However, as the description proceeds, it will become obvious that the amount of such inclination can be made greater or less than the amount stated, depending upon the total amount of adjustment to be provided for gimbal tube 34.

Also, as the description of my invention proceeds, portions of adjusting ring 32A which correspond, respectively, to the named portions of adjusting ring 32 are referred to for reasons of clarity of understanding. Those portions of adjusting ring 32A are shown in certain of the drawing figures, later to be named, wherein each of the portions shown is identified by the same numerical reference character used to identify the corresponding portion of adjusting ring 32, but the letter "A" is suffixed to reference characters used to identify the portions of adjusting ring 32A.

As can be understood from Figs. 4 and 6 through 7B, adjusting ring 32 is accommodated in housing 21 with that ring's end face 42 abutted against the housing's shoulder 24 and with one portion of gimbal tube 34, which tube will be described presently, extending through that ring's axial opening. Note, in Figs. 6B and 7B, that the inside diameter of the adjusting ring's interior, lateral surface 41 is larger than the outside diameter of that portion of the gimbal tube which extends through the ring's opening so that an appreciable space exists therebetween; this space, together with others later to be pointed out, being sufficient to allow for adjusting the gimbal tube's position in housing 21, as will be explained later.

Similarly, adjusting ring 32A is accommodated in housing 21 with that ring's end face 42A (Figs. 6, 6A and 7) abutted against the inner end face of end cap 37, later to be described, and with another portion of gimbal tube 34 extending through that ring's axial opening 41A (Figs. 6B and 7B). Note, in the just named figures, that the diameter of the adjusting ring's interior, lateral surface 41A is larger than the outside diameter of that portion of the gimbal which extends therethrough so that an appreciable space exists therebetween; this space, and others later to be pointed out, being provided for the same reason stated with reference to adjusting ring 32.

Adjusting rings 32 and 32A are rotatable, independently of each other, in housing 21 around gimbal tube 34. As will be explained later, rotation of ring 32 is effected by rotation of adjusting worm 33 (Figs. 2, 5 and 8), later to be described, and is used to adjust the position of gimbal tube 34 in one plane in the housing; and rotation of adjusting ring 32A is similarly effected by rotation of adjusting worm 33A (Figs. 3 and 5) and is used to adjust the position of the gimbal tube in another plane substantially perpendicular to the first stated plane.

How rotation of the adjusting rings changes the position of the gimbal tube will be explained later.

*Adjusting worms*

Adjusting worms 33 and 33A (Fig. 5), like adjusting rings 32 and 32A earlier described, are substantially identical to each other. Therefore, a description of one adjusting worm will suffice for both. For convenience, adjusting worm 33 will be described presently and certain portions of that worm will be identified.

Adjusting worm 33 has a cylindrical head portion 46 (Figs. 2, 5 and 8), a threaded body portion 47 (Fig. 8) and a cylindrical nose portion 48 (Fig. 8); the just-named portions being concentric with each other as is usual.

Adjusting worm 33A, of course, is likewise provided with head, body and nose portions; and, as the description of the invention proceeds, those portions are referred to for reasons of clarity of description. However, in the drawings (Figs. 3 and 5), only the head portion of adjusting worm 33A is shown; that portion being identified by the reference character 46A.

As shown in Fig. 8, adjusting worm 33 is positioned in housing 21 with the worm's head, body and nose portions 46, 47 and 48, respectfully, in an accommodating, stepped recess, a portion of which recess is in arm 26 and the remainder of which is partly in housing 21 and partly in lug 28; the named adjusting worm being positioned with its threaded body portion 47 in mating engagement with the worm gear teeth in adjusting ring 32 and being supported, at its head and nose portions, for unlimited rotation in a clockwise or in a counterclockwise direction, as viewed in Fig. 5.

From the description just made relating to adjusting worm 33 and the earlier made description of adjusting ring 32, it is easily understandable that, as the named adjusting worm is so rotated about its axis, the named adjusting ring is rotated in a clockwise or in a counterclockwise direction, as viewed in Fig. 8, about its own axis in housing 21; the amount and direction of the ring's rotation depending, of course, upon the amount and direction of the adjusting worm's rotation. What happens when adjusting ring 32 is so rotated will be fully explained later.

Because of the worm-worm gear relationship between adjusting worm 33 and adjusting ring 32, those members are self-locking so that it is not necessary to provide means for securing one or both of those members in any one adjusted position. However, any convenient form of such means could be provided, if desired.

Adjusting worm 33A (Figs. 3 and 5) fits into housing 21, along side of adjusting worm 33, in a manner similar to that explained for the last-named adjusting worm; the head and nose portions of adjusting worm 33A being accommodated as shown for adjusting worm 33 in Fig. 8, and the threaded body portion of adjusting worm 33A being in mating engagement with the worm gear teeth on adjusting ring 32A, as also shown for adjusting screw 33 in Fig. 8. Therefore, when adjusting worm 33A is rotated about its axis in a clockwise or in a counterclockwise direction, as viewed in Fig. 5, adjusting ring 32A is rotated accordingly; the amount and direction of that adjusting ring's rotation depending upon the amount and direction of that adjusting worm's rotation. What happens when adjusting ring 32A is rotated will be fully explained later.

To retain adjusting worms 33 and 33A in housing 21 in mating engagement with the respective adjusting rings and, yet, to allow those worms to be rotated as may be required, there is provided a pin 49 (Figs. 2 and 8). This pin is accommodated in housing 21 so that one portion of the pin's lateral surface, as can be understood from Fig. 8, mates with a circumferential, arcuate groove 50 in head portion 46 of adjusting worm 33, and so that another portion of the pin similarly mates with a corresponding arcuate groove (not shown) formed in the head portion of adjusting worm 33A; pin 49 being retained in the housing in any convenient manner (not shown).

Gimbal tube

Gimbal tube 34 (Figs. 2, 3, 4, 6 through 8, 9A through 9A, 12, 14 and 16) has a cylindrical, exterior, lateral surface which comprises the concentric portions 52 and 53 (Figs. 4, 6, 6A, 7, 7B, 9B through 9D, 12, 14 and 16) which are joined by the radially extending, annular shoulder 54. As best shown in Figs. 9A and 9B, the gimbal tube's portion 52 is provided with a radially extending, annular flange 55 (also see Figs. 4, 6, 6B, 7 and 7B), the rim 56 (Figs. 6, 6A, 6B, 7, 7B, 9A and 9B) of which forms an equatorial surface of a sphere (i. e., a surface portion which extends substantially equal distances on both sides of the sphere's equator); the center of the sphere lying on the gimbal tube's axis and the diameter of the sphere being slightly less than the diameter of portion 23 (Figs. 6, 7, 7B and 8) of the end to end opening of housing 21.

In Fig. 9B, it is shown that the opening extending longitudinally through gimbal tube 34 has a conical portion 57 (also see Figs. 2, 6B, 8, 9A and 16) and an adjacent cylindrical portion 58 (also see Figs. 2, 3, 7B and 9B); the cylindrical portion adjoining the conical portion's smaller diametered end.

In the embodiment of the invention under discussion, the axis of the gimbal tube's longitudinally extending opening is inclined with reference to the axis of the gimbal tube proper, as can be understood from Figs. 6B, 9A and 9B. This, however, is done to satisfy certain requirements, which it does not seem necessary to deal with herein, having to do with the gunnery art. In the present instance, this inclination is in the order of two (2) degrees. Of course, this amount can be made less or greater than that amount, depending upon the requirement to be satisfied. Indeed, it will become apparent, as the description proceeds, that the two-named axes may even be congruent with each other in some embodiments of the invention without materially affecting the nature thereof.

Conical portion 57 is provided to form a convenient seat for the telescope, or other object, which is to be supported by the support; such telescope, or other object, being provided with a similar conical portion which fits into and is seated against the gimbal tube's conical portion, as will later be explained. Inasmuch as the position of the support's gimbal tube is adjustable, as will be fully explained later, in two planes which are substantially perpendicular to each other, the position of the telescope, or other object, in the gimbal tube is adjustable accordingly.

Positioned in one face of flange 55, in a manner later to be explained, are the shoes 35 and 36 (one of which is shown in Figs. 4, 6, and 6A, and both of which are shown in Figs. 7, 7A and 16), and similarly positioned in the other face of flange 55 are the shoes 35A and 36A (one of which is shown in Figs. 4, 7 and 7A, and both of which are shown in Figs. 6 through 6B, 9A and 16). As can best be understood from the last-named figure, shoes 35 and 36 are substantially diametrically opposed to each other, and shoes 35A and 36A are also substantially diametrically opposed to each other and, further, are substantially perpendicular to shoes 35 and 36. Essential details relating to these shoes will be given later under separate subheading.

As can be understood from Figs. 2, 4 and 6 through 7B, gimbal tube 34 carrying shoes 35, 36, 35A and 36A is positioned in housing 21 with spherical rim 56 of the gimbal tube's flange 55 being supported in portion 23 of the housing's end to end opening, with that part of the tube's portion to one side of flange 55 pressing through the central opening of adjusting ring 32 and extending into portion 22 of the housing's longitudinally extending opening, and with that part of the gimbal tube's portion 52 to the other side of flange 55 passing through the central opening of adjusting ring 32A and extending, along with that tube's portion 53, into cap ring 37 later to be described. With the gimbal tube so positioned, shoes 35 and 36 (Fig. 7A) are between one face of the gimbal tube's flange 55 and end face 43 of adjusting ring 32, and shoes 35A and 36A (Fig. 6A) are between the other face of the gimbal tube's flange and end face 43A of adjusting ring 32A.

Note, in Figs. 6 and 7 for example, that the outside diameter of the gimbal tube's portion 52 is less than the diameter of portion 22 of the end to end opening in housing 21 so that an appreciable space exists therebetween. This space, along with the spaces, earlier pointed out, between the outside of the gimbal tube and the inside of adjusting rings 32 and 32A, and along with other spaces, later to be pointed out, being sufficient to allow for adjusting the gimbal tube's position in housing 21 as will be explained later. In other words, gimbal tube 34 and housing 21 may, at present, be considered to have a ball and socket joint relationship to each other, the gimbal tube being comparable to the ball member of such type joint, and the housing being comparable to the socket member of such type joint.

Additionally, with gimbal tube 34 in position in housing 21, that tube is prevented from rotating in a clockwise or in a counterclockwise direction, as viewed in Figs. 2, 3 and 8, about its axis in housing 21 by a pin 59 (Fig. 4). This pin extends through the housing's wall and projects from inside the housing into mating engagement with a groove 60 (Fig. 7) formed in rim 56 of the gimbal tube's flange 55; the pin and the groove being in such relationship to shoes 35, 36, 35A and 36A so to allow the position of the gimbal tube later to be adjustable in two planes which are substantially perpendicular to each other.

As partial provision for releasably interlocking the support and the object to be supported thereby (i. e., a sighting telescope, in the embodiment of the invention being described), gimbal tube 34 is provided with the diametrically opposed grooves 61 (Figs. 2, 3, 6B, 7B, 12, 14 and 16). As shown in Figs. 6B and 7B, these grooves are formed in cylindrical portion 58 and in part of the conical portion of the gimbal tube's longitudinally extending opening. As can be understood from Fig. 6B, wherein one groove is shown, these grooves extend in the same direction as the axis of the gimbal tube's longitudinally extending opening; and, as can be understood from Fig. 7B, the bottom of the respective grooves are substantially parallel to the axis of the gimbal tube's longitudinally extending opening. How these grooves enter into the invention will be described later, when the operation thereof is described.

Also, as partial provision for releasably interlocking the support and the object to be supported thereby, that end of gimbal tube 34 which determines the outer extremity of cylindrical portion 58 of that tube's longitudinal opening is made in a manner later to be explained when the provision for releasably interlocking the support and the telescope together is described.

As will also be pointed out at that time, the remainder of the provision for releasably interlocking the support and telescope is incorporated in the telescope itself.

Shoes

Shoes 35 and 36 (Figs. 7 and 7A) and shoes 35A and 36A (Figs. 6 through 6B and 9A) are substantially identical to each other. However, inasmuch as shoes 35 and 36, as earlier stated and as shown in Figs. 7 and 7A, are positioned between one face of the gimbal tube's flange 55 and end face 43 (Figs. 7 and 7A) of adjusting ring 32, as will be explained presently; and inasmuch as shoes 35A and 36A, as earlier stated and as shown in Figs. 6 through 6B, are similarly positioned between the other face of the gimbal tube's flange and end face 43A (Figs. 6 and 6A) of adjusting ring 32A, as will also be explained presently, it seems expedient to describe shoes 35 and 36 successively and to identify certain portions of these shoes. It is believed that such procedure will be adequate to lead, also, to a full understanding of shoes 35A and 36A.

Shoe 35 is a substantially semi-cylindrical member whose lateral surface is formed partially by an arcuate portion 63 (Figs. 6 and 6A) and partially by a flat portion 64 (Figs. 6 and 6A), and whose opposite, longitudinal ends are formed by a flat surface 65 (Fig. 7B) at one end of the shoe and a spherical surface 66 (Fig. 7B) at the opposite end; flat surface 65 being substantially perpendicular to the shoe's lateral surface, and spherical surface 66 having a spherical radius which is substantially equal to that of the gimbal tube's spherical rim 56. Also, spherical surface 66 is generated about a center (not shown) so located with reference to the shoe's flat, lateral portion 64 and its flat end 65 that, when that shoe is positioned in the gimbal tube's flange, as will be explained presently, the shoe's end surface 66 is substantially continuous with the gimbal tube's spherical rim 56.

Similarly, the lateral surface of shoe 36 is formed partially by an arcuate portion 67 (Fig. 7B) and partially by a flat portion 68, and the opposite, longitudinal ends of that shoe are formed by a flat surface 69 at one end of that shoe and by a spherical surface 70 at the other end.

As the description proceeds, certain portions of shoe 35A which correspond, respectively, to the earlier-named portions of shoe 35 will be referred to for reasons of clarity of description. Those portions of shoe 35A are shown in certain of the drawing figures, later to be named, wherein each of the portions shown is identified by the same numerical reference character used to identify the corresponding portion of shoe 35, but the letter "A" is suffixed to reference characters identifying portions of shoe 35A.

Likewise, certain portions of shoe 36A which correspond, respectively, to the earlier-named portions of shoe 36 will be referred to for reasons of clarity of description. Those portions of shoe 36A are shown in certain of the drawing figures, later to be named, wherein each of the portions shown is identified by the same numerical reference character used to identify the corresponding portion of shoe 36, but the letter "A" is suffixed to reference characters used to identify portions of shoe 36A.

As earlier stated and as shown in Figs. 7 and 7A, shoes 35 and 36 are positioned, in a substantially diametrically opposed relationship to each other, between one face of the gimbal tube's flange 55 and end surface 43 of adjusting ring 32. Each shoe is positioned with the arcuate portion of each shoe's lateral surface resting partially in a similarly shaped, radially extending groove formed in the one face of the gimbal tube's flange, as shown for arcuate portion 63 of shoe 35 in Figs. 6 and 6A; with the flat portion of each shoe's lateral surface abutting end face 43 of adjusting ring 32, as best shown for flat portion 64 of shoe 35 in Figs. 6 and 6A, further, flat end surfaces 65 and 69 of the respective shoes abut the gimbal tube's portion 52, as best shown in Fig. 7B, and spherical end surfaces 66 and 70 of the respective shoes are substantially continuous with the gimbal tube's spherical rim 56, as also best shown in Fig. 7B.

Note, in Figs. 6 and 6A, that flat portion 64 of the lateral surface of shoe 35 is off-set from the one face of the gimbal tube's flange. Substantially the same condition exists between the flat portion of the lateral surface of shoe 36 and that face of the gimbal tube's flange. In consequence of these conditions, a space is formed between the one face of the gimbal tube's flange 55 and end face 43 of adjusting ring 32; such space, along with other spaces earlier referred to and along with other spaces later to be mentioned, being sufficient to allow for adjusting the position of the gimbal tube, as will later be explained, without having those surfaces meet each other.

Similarly, as earlier stated and as shown in Figs. 6 and 6A, shoes 35A and 36A are positioned, in a substantially diametrically opposed relationship to each other and, further, are positioned in a substantially perpendicular relationship to shoes 35 and 36 (Fig. 16), between the opposite face of the gimbal tube's flange and end face 43A of adjusting ring 32A. That is, each of shoes 35A and 36A is positioned with the arcuate portion of each shoe's lateral surface resting partially in a similarly shaped, radially extending groove formed in that face of the gimbal tube's flange, as shown for arcuate portion 63A of shoe 35A in Fig. 7; and with the flat portion of each shoe's lateral surface abutting end face 43A of adjusting ring 32A, as shown for flat portion 64A of shoe 35A in Fig. 7. Also, flat end surfaces 65A and 69A of the respective shoes abut the gimbal tube's portion 52, as shown in Figs. 6B and 9B; and spherical end surfaces 66A and 70A of the respective shoes are substantially continuous with the gimbal tube's spherical rim 56, as also shown in Figs. 6B and 9B.

Note, in Fig. 7A, that flat portion 64A of the lateral surface of shoe 35A is off-set from the one face of the gimbal tube's flange. Substantially the same condition exists between the flat portion 68A of the lateral surface of shoe 36A and that face of the gimbal. Therefore, a space is formed between that face of the gimbal tube's flange and end face 43A of adjusting ring 32A adjacent thereto; such space, along with other spaces earlier referred to and along with other spaces later to be mentioned, being sufficient to allow for adjusting the position of the gimbal tube, as will later be explained, without having those surfaces meet each other.

*Cap ring*

Cap ring 37 (Figs. 1, 3 through 7 and 7B) is provided, upon its exterior, lateral surface, with a threaded portion 73 (Figs. 4 and 6) and with an annular shoulder 74 (Figs. 1 and 4 through 6). As shown in Figs. 6, 6A and 7B, the cap ring's axially extending opening is made up of the portions 75 and 76 which are adjacent each other and are joined by an annular shoulder 77; the just-named portions being concentric with each other and with the cap's threaded portion 73.

As can be understood from Figs. 4 and 6 through 7B, the cap ring's externally threaded portion 73 screws into interiorly threaded portion 25 of housing 21 until the cap ring's shoulder 74 abuts the housing's end surface; the cap ring being provided with the spanner wrench holes 78 (Fig. 3) so that the cap ring can be tightly joined to the housing by use of such wrench type. Of course, after the cap ring is so joined to the housing, that ring may be prevented, in any convenient manner (not shown) from becoming unscrewed from the housing.

With cap ring 37 so joined to housing 21, the cap ring encircles one end of gimbal tube 34, as shown in Figs. 4 and 6 through 7B, and that ring's inner end face (i. e., that end face inside the housing) lightly abuts end face 42A (Figs. 6 through 6B and 7) of adjusting ring 32A, thereby retaining the support's named adjusting rings, gimbal tube and shoes in assembled relationship in housing 21 and, yet, allowing for rotation of the adjusting rings 32 and 32A and attendant adjustment in the position of gimbal tube 34, as will presently be explained.

Note, in Figs. 6, 6A and 7B, that the diameter of each of portions 75 and 76 of the cap ring's axial opening is larger than the outside diameter of each of the gimbal tube's corresponding portions 52 and 53, respectively, so that annular spaces exist therebetween; these spaces, along with other annular spaces earlier mentioned and along with another space to be mentioned presently, being sufficient to allow the position of the gimbal tube to be adjusted in housing 21, as will be explained later.

Note also, in the last-named figures, that the cap ring's shoulder 77 is spaced, in a direction along that ring's axis, from the gimbal tube's shoulder 54 so that another space exists between those shoulders; this space, along with other spaces earlier mentioned, being sufficient to allow for adjusting the position of gimbal tube 34 in housing 21.

Sealing rings

Sealing rings 38 and 39 (Figs. 4, 6 and 7) are made of rubber, or other resilient material, and are, essentially, identical to each other.

As is easily understandable from the last-named figures, sealing ring 38 encircles gimbal tube 34 near one end of that tube so that the sealing ring, by virtue of its resilience, "hugs," to use a common expression, the outside of that tube. Also, the outer portion of that ring (i. e., the portion toward the ring's outside diameter) is accommodated in an annular groove formed in portion 22 (Figs. 6, 7 and 7B) of the housing's axially extending opening. Sealing ring 38, in other words, closes the space between the outside of the gimbal tube and portion 22 of the housing's end to end opening; but yet, because of the nature of the material of which it is made, allows the position of the gimbal tube to be adjusted in the support's housing 21, as will later be explained.

Similarly, sealing ring 39 (Figs. 4, 6, 7 and 7B) encircles gimbal tube 34 near that tube's opposite end, and the outer portion of that ring is similarly accommodated in an annular groove formed in portion 76 (Figs. 6, 6A and 7B) of the cap ring's axially extending opening. Sealing ring 39, therefore, closes the space between the outside of the gimbal tube and portion 76 of the cap ring's axial opening; but, yet, allows the position of the gimbal tube to be adjusted in the support's housing 21.

Thus, from the foregoing explanation, it is readily appreciated that sealing rings 38 and 39, although allowing the position of gimbal tube 34 to be adjusted in housing 21, prevent the loss of lubricant from inside housing 21 and prevent incursion of foreign matter into that housing.

CHANGING THE GIMBAL TUBE'S POSITION

From the foregoing description relating to adjusting rings 32 and 32A, to gimbal tube 34, to shoes 35, 36, 35A and 36A, and to cap ring 37, it is easily understandable that, as adjusting ring 32 is rotated through the agency of adjusting worm 33 (Fig. 5), gimbal tube 34, by virtue of its spherical rim 56 and by virtue of the spaces provided, moves about the arcuate portions of shoes 35A and 36A (see Figs. 7 and 7A wherein arcuate portion 63A of shoe 35A is shown). This movement changes the position of the gimbal tube in one plane (i. e., from left to right, or vice versa, of the drawing sheet in Figs. 7 through 7A) in the support's housing 21. This will be more fully explained later when the operation of the invention is described. Of course, as the position of the gimbal tube is so changed, the position of the object supported by the gimbal tube is changed accordingly. Similarly, it is understandable that, as adjusting ring 32A is rotated through the agency of adjusting worm 33A (Fig. 5), gimbal tube 34, by virtue of its spherical rim 56 and by virtue of the spaces provided, moves about the arcuate portions of shoes 35 and 36 (see Figs. 6 and 6A wherein arcuate portion 63 of shoe 35 is shown) to change the position of the gimbal tube in another plane (i. e., from top to bottom, or vice versa, of the drawing sheet in Figs 6 through 6B) substantially perpendicular to the direction in which the tube is moved by rotation of adjusting ring 32. This, too, will be more fully explained later when the operation of the invention is described. Of course, as the position of the gimbal tube is so changed, the position of the object supported thereby is changed correspondingly.

ATTACHMENT OF THE SUPPORT TO A RECOILLESS RIFLE

As earlier stated, the embodiment of the invention being described is attached to a recoilless rifle and is used as a support for the sighting telescope by which the rifle is aimed. The support and telescope are releasably interlocked with each other, and the position of the telescope is adjustable, as may be necessary during boresighting the telescope and the rifle or during use of the rifle, in two imaginary planes (e. g., in azimuth and in elevation) which are substantially perpendicular to each other.

Presently, the attachment of the support to a recoilless rifle will be described. After that, the provision for releasably interlocking the telescope and the support together will be described; then the operation of the invention, in terms of the illustrative embodiment, will be explained.

The recoilless rifle 79, to which my support is attached, is represented partially in Fig. 1, wherein the rifle's rear portion (i. e., that portion including the rifle's breech end 80, its shoulder rest 81, a portion of its barrel 82, its trigger handle 83 and its steadying handle 84) is drawn in comparatively thin lines.

As can be understood from Figs. 1, 2 and 4, the support's band 30, to which band the rifle's trigger handle 83 (Figs. 1 and 2) and its steadying handle 84 may be attached (which parts are not the subject of the present application), fits around a portion of the rifle's barrel 82 with the support's cap ring 37 toward the rifle's muzzle (not shown); band 30 being secured to barrel 82 in any convenient manner (not shown).

With the support secured to the rifle's barrel 82, shoes 35 and 36 (Figs. 7 and 7A) lie along an imaginary horizontal line, when the rifle is held in the usual position for firing from one's shoulder; shoes 35A and 36A (Figs. 6 through 6B) lie along an imaginary vertical line, when the rifle is held in the position just mentioned; and the support's housing 21 (Figs. 1, 2 and 4) is disposed in spaced, substantially parallel relationship to the rifle's barrel, that housing being above and toward the left of the barrel, as can be understood from Figs. 2 and 4.

Later, when the sighting telescope is inserted into and releasably interlocked with the support, as will be explained, the telescope's eye-piece shade 99 (Fig. 1), which shade is attached to the telescope's first housing 100 in convenient manner, assumes such a position relative to the rifle's shoulder rest 82 that, when the rifle is held in usual position for firing from one's right shoulder, the telescope can easily be looked into for the purpose of aiming the rifle.

PROVISION FOR RELEASABLY INTERLOCKING THE SUPPORT AND THE SIGHTING TELESCOPE TOGETHER

It is easily understandable that, in some applications of my invention other than those like, or similar to, the application of the illustrative embodiment, the support's housing 21 may be in such position that the axis of the longitudinally extending opening of gimbal tube 34 in that housing is in a more or less vertical position, so that, when the object to be supported is placed in the gimbal tube, the force of gravity acting on that object will tend to hold that object seated in the gimbal tube. Therefore, when housing 21 is in such position, there may be no necessity to releasably interlock the support's gimbal tube and the object supported thereby together.

However, when the support is used in such a position that the axis of its housing 21 and the axis of its gimbal tube 34 are more or less horizontal, or when the support is so used that the axis of the housing and the axis of the gimbal tube may, at one time or another, be in any one of a number of different positions, as in the application of the illustrative embodiment of the invention, I find it preferable to releasably interlock together the support's gimbal tube and the object which fits therein and is supported thereby (i. e., a sighting telescope in the present instance), in order to hold that object in the gimbal tube and, consequently, to prevent the object from becoming unseated in the gimbal tube.

To provide for releasably interlocking the support and the telescope together so that those members are inseparable until the interlock is released, the support's gimbal tube 34 and the telescope supported thereby are made as will now be explained.

*Provision on the support's gimbal tube for releasably interlocking with the telescope*

As to gimbal tube 34, that end thereof which is at cylindrical portion 58 of the gimbal tube's longitudinally extending opening is formed by three pairs of areas best shown in Figs. 3 and 14. The areas of one pair are identified by the reference characters 85 (also see Figs. 4, 6, 6B, 7, 7A, 12 and 13 through 13B) and 86 (also see Figs. 6, 7B, 9B through 9D, 12 and 15); the areas of another pair are identified by the reference characters 87 (also see Figs. 4, 6, 7, 7A, 9B through 9D, 12, 13 through 13B and 15) and 88 (also see Figs. 6B, 7B and 12); and the areas of the remaining pair are identified by the reference characters 89 (also see Figs. 4, 6B, 7, 12 and 13 through 13B) and 90 (also see Figs. 6B and 7B).

As can be easily understood from Figs. 3 and 14, the areas of each pair are substantially diametrically opposed to each other relative to portion 68 of the gimbal tube's longitudinally extending opening, are similar to each other in angular extent, but are different from the areas of the other pairs, as will presently be explained.

Areas 85 and 86 are coplanar with each other, are substantially perpendicular to the axis of the gimbal tube's longitudinally extending opening, and are farthermost removed from the gimbal tube's opposite end face, which end face is also substantially perpendicular to the axis of the gimbal tube's longitudinally extending opening.

Areas 87 and 88 are coplanar with each other, are parallel to areas 85 and 86, and are closer to the gimbal tube's opposite end face than areas 85 and 86; a step 91 (Figs. 3, 6, 9B through 9D, 12, 14 and 15) being formed between areas 86 and 87 and being continuous with one side of one of the diametrically opposed grooves 61 formed in the gimbal tube's longtiudinally extending opening, as shown in Figs. 3, 12 and 14; and a similar step 92 (Figs. 3, 6B, 12 and 14) being formed between areas 85 and 88 and being continuous with one side of the other of the diametrically opposed grooves 61 in the gimbal tube's longitudinally extending opening.

And, areas 89 and 90 are coplanar with each other, are parallel to areas 87 and 88, and are still closer to the gimbal tube's opposite end face than areas 87 and 88; a step 93 (Figs. 3, 4, 7, 12, 13 through 13B and 14) being formed between areas 87 and 89, and a similar step 94 (Figs. 3, 7B, 12 and 14) being formed between areas 88 and 90; and step 95 (Figs. 3, 4, 7, 9C, 12, 13 through 13B and 14) being formed between areas 85 and 89, and a similar step 96 (Figs. 3, 7B, 12 and 14) being formed between areas 86 and 90. As shown in Figs. 4, 7, 7A and 13 through 13B, step 93, between areas 87 and 89, is less than step 95, between areas 85 and 89; and, as shown in Fig. 7B, step 94, between areas 88 and 90, is less than step 96, between areas 86 and 90. The reason for the just stated conditions will become apparent later.

For convenience of later description, steps 93 and 95, and area 89 (Figs. 3, 4, 7, 12, 13 through 13B and 14) form what I shall refer to as a first locking groove; and, similarly, steps 94 and 96, and area 90 (Figs. 3, 7B and 14) form what I shall refer to as a second locking groove.

How the named areas, steps and locking grooves enter into the invention will be explained later herein, when the insertion of the telescope into the gimbal tube and the releasable interlocking of these parts together is explained.

*Provision on the sighting telescope for releasably interlocking with the support's gimbal tube*

As to the rifle's telescope, for present purposes it seems necessary only to describe the construction insofar as that construction relates to the support and to the extent that the telescope is fashioned to releasably interlock with the support.

For convenience of description, the telescope may be considered to comprise a first tubular housing 100 (Figs. 1, 6, 7, 7A, 9 through 9D, 10 and 11) and a second tubular housing 101 (Figs. 1, 6, 6A, 7, 7A, 9, 9C through 12, 14 and 16), which housings contain optical and other components (not shown) of usual character collectively comprising the telescope's sighting system. A description of those housings, as relating to the invention being disclosed, follows.

First housing 100, essentially, is made up of a cylindrical portion 103 (Figs. 1, 6A, 7, 9 through 9B and 11), a smaller diametered cylindrical portion 104 (Figs. 1, 6A, 7, 9 through 9B, 10 and 11), and a conical portion 105 (Figs. 9 through 9B, 10 and 11), which portion is provided with an annular clearance groove 106 (Figs. 9 through 9D, 10 and 11); the diameter at the larger end of the just-named conical portion being substantially equal to the diameter of adjacent cylindrical portion 104 and to the diameter of the larger end of conical portion 57 of the gimbal tube's longitudinally extending opening, and the taper and length of the second housing's conical portion being such that the telescope will fit into the gimbal tube's longitudinally extending opening as will later be explained.

Second housing 101, essentially, is made up of a cylindrical portion 110 (Figs. 9 and 11) and a smaller diametered shank portion 111 (Figs. 1, 6A, 7, 7A, 9, 9C through 11, 12, 14 and 16); these portions being concentric to each other and being joined by a chamfered, annular shoulder 112 (Figs. 9 and 11). For purposes of the present invention, the diameter of cylindrical portion 110 is less than the diameter of cylindrical portion 58 (Figs. 2, 3 and 7B) of the gimbal tube's longitudinal opening; this being done so that the telescope's named cylindrical portion may pass through the gimbal tube's opening, as will later be explained.

On the second housing's shank portion 111 is a tubular sleeve 113 (Figs. 1, 6, 6A, 7, 7A, 9 and 9B through 16) whose outside diameter is less than the diameter of cylindrical portion 58 (Figs. 2, 3 and 7B) of the gimbal tube's longitudinally extending opening for reasons which will be obvious from later description. This sleeve is rotatable in a clockwise or in a counterclockwise direction, as viewed in Figs. 12, 14 and 16, relative to shank portion 111 and is also movable rectilinearly on that shank portion in one direction or the other along the shank portion's length.

As shown in Fig. 11, sleeve 113 is provided with a portion 114 of reduced diameter, with a shoulder 115 and with an externally threaded portion 124 (also see Figs. 9 through 9B and 10); the diameter over the threaded portion being less than the diameter of portion 114, as is usual practice.

Positioned on the sleeve's cylindrical portion 114, concentricaly thereto and free to rotate thereon, is a ring 116 (Figs. 1, 6, 6A, 7, 7A, 9, 9B through 11, 13 through 13B and 16); one end face of this ring abutting the sleeve's shoulder 115, as shown in Figs. 1, 6A, 7, 7A, 9B through 9D and 11. For reasons which will become apparent as the description proceeds, the outside diameter of ring 116 is substantially equivalent to the maximum outside diameter of sleeve 113.

Projecting radially outward from the lateral surface of ring 116 are the diametrically opposed locking projections 117 (one of which is shown in each of Figs. 7, 9, 9B, 13 through 13B and 15; both of which projections are shown in Figs. 1, 9C, 9D, 10, 12, 14 and 16). In the present instance, the width of each lug (i. e., the dimension from left to right, or vice versa, of the drawing sheet in Figs. 7, 12 and 13 through 13B; or the dimension from top to bottom, or vice versa, of the drawing sheet in Figs. 9, 9B and 14 through 16) is less than the width of each groove 61 (Figs. 2, 3, 12, 14 and 16) formed inside gimbal tube 34 and slightly less than the width (i. e., the dimension from left to right, or vice versa, of the drawing sheet in Figs. 3 and 14) of areas 89 and 90 in the gimbal tube's end face. For convenience of later inserting the telescope into the gimbal tube, the ends of the respective locking projections 117 proximal to the sleeve's shoulder 115 are beveled off, as indicated at 118 in Figs. 7, 9, 9B through 9D, 10 and 12 through 15.

Between ring 116 and sleeve 113 is a clutch spring 119 (Figs. 11 and 16). As shown in the latter figure, this spring undulates between the ring and the sleeve; certain portions of the spring being accommodated in an annular groove 120 (Figs. 11 and 16) formed in the inside of the ring, and certain other portions of the spring being accommodated in a similar groove 121 formed in the sleeve's portion 114. Through the agency of these undulations, therefore, the ring is retained on the sleeve. Furthermore, the nature of this spring is such that, when positioned as stated and as shown in Fig. 16, those undulations in contact with the ring exert a pressure against that ring and those undulations in contact with the sleeve exert a similar pressure against that sleeve. In consequence of these pressures, when the sleeve is rotated, the ring is also rotated, provided nothing interferes with the ring's rotation. However, should the ring be prevented from rotating, as will later be explained, the sleeve, nevertheless, may still be rotated alone.

To provide for positioning clutch spring 119 between ring 116 and sleeve 113 there is a gap 122 (Fig. 16) between the ends of that spring; the gap being sufficient to allow for such positioning. Of course, as the ring, the sleeve and the spring are being assembled, gap 122 closes up; and, after those parts are assembled, the gap springs open as shown in the named figure.

As shown in Fig. 11, the left end of the second housing's shank portion 111 fits into an accommodating opening in the right end of first housing's conical portion 105; those housings being secured together in convenient manner, as by brazing or other means, so as to become integral with each other. Also, as shown in Fig. 117 threaded portion 124 of sleeve 113 on the second housing's shank portion 111 mates with a similarly threaded recess 123 formed in the right end of first housing 100. It is obvious, therefore, that, as sleeve 113 is rotated relative to the first and second housings, the named sleeve and ring 116 thereon are moved between the smaller end of the first housing's conical portion 105 and the second housing's shoulder 112; the amount and direction of such movement depending, of course, on the amount and direction of the sleeve's rotation.

OPERATION

Having explained the construction of the support and how the support's gimbal tube 34 and the telescope are made so as to be releasably interlockable with each other, the operation of the invention will now be described. For convenience, the operation of my invention may be considered to comprise the matters of: inserting the telescope into the support's gimbal tube and releasably interlocking those parts together; adjusting the position of the telescope in elevation; and the matter of releasing the interlocking engagement between the telescope and the support's gimbal tube. Therefore, the description of the operation of my invention will be given under appropriate sub-headings which relate to the just named matters.

*Inserting the telescope into the support's gimbal tube and releasably interlocking those parts together*

Initially, in preparation for inserting the telescope into the gimbal tube and for releasably interlocking those parts together, assume sleeve 113 (Figs. 1, 6, 6A, 7, 7A, 9 and 9B through 16) to have been rotated on the second housing's shank portion 111 (Figs. 1, 6A, 7, 7A, 9, 9C through 12, 14 and 16) and, thereby, to have been moved in a direction along the shank portion's axis, until the right end face of the named sleeve, as viewed in Figs. 9 and 11, abuts the second housing's shoulder 112; this having been done so that ring 116, on that sleeve, is moved, as much as possible, away from the smaller diametered end of the first housing's conical portion 105.

To insert the telescope into the support, the telescope, as can be easily understood from Figs. 9A and 9B, is inserted, second housing 101 foremost, into the larger diametered end of conical portion 57 of the gimbal tube's longitudinally extending opening so that the telescope's conical portion 105 is seated in the conical portion of the gimbal tube's just-named opening and so that a pin 126 (Figs. 2, 4, 6B, 7A, 7B, 9A and 9B), extends through the gimbal tube's wall and projects into conical portion 57 of the gimbal tube's opening, mates with a recess 127 (Figs. 9A and 10) formed in the telescope's portion 105; the engagement between pin 126 and recess 127 being provided to establish and to maintain the telescope in a certain desired rotative position in the gimbal tube. During such insertion, diametrically opposed grooves 61 (Figs. 2, 3, 6B, 7B, 12, 14 and 16) formed in the gimbal tube's longitudinally extending opening provide for the passage through that opening of locking projections 117 on ring 116 carried by sleeve 113 on the second housing. This can be understood from Fig. 16.

When the telescope is seated in gimbal tube 34, as just explained, the right end of conical portion 105 of the telescope's first housing 100 is positioned to the left of areas 89 and 90, as shown for the conical portion's right end and area 89 in Fig. 9B; and the left end face of ring 116 "clears," to use a common expression, the right end of the gimbal tube, as also shown in somewhat exaggerated amount in Fig. 9B wherein the telescope is so seated in the gimbal tube.

In order to releasably interlock together the telescope and the gimbal tube, sleeve 113 (Fig. 9B) is rotated relative to the telescope's first and second housing's 100 and 101, respectively, so that the sleeve, and ring 116 thereon, are moved toward the smaller diametered end of the first housing's conical portion 105; the ring rotating along with the sleeve by virtue of clutch spring 119 (Figs. 11 and 16), earlier described, positioned between the sleeve and the ring. As this rotation of the sleeve is continued, the left end of ring 116 enters the cylindrical portion (Fig. 9C) of the gimbal tube's longitudinally extending opening (Fig. 9C), one side of one of the locking projections 117 on ring 116 abuts step 95 (Fig. 13A) and the corresponding side of the other locking projection simultaneously abuts step 96 (Fig. 12). Such abutting, of course, prevents ring 116 from rotating any farther in the stated direction, but does not interfere with further rotation of sleeve 113. Therefore, upon continued rotation of the sleeve, clutch spring 119 (Figs. 11 and 16) yields, and that sleeve and ring 116 thereon, are moved closer to the smaller diametered end of the telescope's conical portion 105. This action causes one locking projection 117 on ring 116 to move between steps 93 and 95 into the first locking groove and into abutment with area 89 (Figs. 7 and 13); and simultaneously causes the ring's other locking projection to move between steps 94 and 96 (Figs. 3, 7B and 14) into the second locking groove and into abutment with area 90 in similar manner. As a result, the telescope and gimbal tube 34 are releasably interlocked together (Figs. 1, 6, 6A, 7, 7A, 9D, 12 and 13). Consequently, the telescope cannot be separated from the support until the engagement is released, this being done as will be described later herein.

Although the just described procedure involves the steps stated and may seem to require a large amount of time, that procedure, actually, can be carried out very quickly, even without undue haste.

With the telescope inserted and releasably interlocked with the support's gimbal tube, as earlier explained, the telescope's eyepiece shade 99 (Fig. 1) assumes such a position with reference to the rifle's shoulder rest 81 that, when the gun is held by handles 83 and 84 and is used while resting on one's right shoulder, in a well known manner, the eyepiece shade is in a convenient position with respect to one's right eye so that the rifle can be aimed by use of the telescope.

Adjusting the position of the sighting telescope in azimuth

There are times when it is desirable to adjust in azimuth the position of the sighting telescope. This is done to move a sighting reticle (not shown), contained inside the telescope, into a certain desired relationship in azimuth, with the image of a target, as may be necessary during bore-sighting of the telescope and the rifle, or as may be necessary during use of the recoilless rifle.

In order to adjust the position of the telescope in azimuth, adjusting worm 33 (Figs. 2, 5 and 8), which worm is designated by the letters "AZ" (Fig. 5) formed in convenient manner on the housing's arm 26 near that worm's head, is rotated in the direction and in the amount required. Inasmuch as that worm's threaded portion 47 (Fig. 8) is in mating engagement with worm gear teeth 40 (Figs. 6, 6B and 7) formed in adjusting ring 32, as earlier stated, that adjusting ring is rotated accordingly.

As adjusting ring 32 is so rotated, end face 43 (Figs. 6 and 6A) of that ring, which end face, as stated, is inclined with respect to that ring's opposite end face 42, acts on shoes 35 and 36 to pivot gimbal tube 34 about the arcuate portions of shoes 35A and 36A (one of which shoes is shown in Figs. 7 and 7A and both of which are shown in Figs. 6B and 9B) and to change the position of gimbal tube 34 in azimuth (i. e., from left to right, or vice versa, of the drawing sheet in Figs. 7 through 7B); the amount and direction of such movement depending upon the amount and direction of the adjusting worm's and of the adjusting ring's rotation. Of course, as the position of the gimbal tube is so changed, the position of the sighting telescope in the gimbal tube is changed accordingly.

The just-stated movement of gimbal tube 34, in consequence of rotation of adjusting worm 33 and attendant rotation of adjusting ring 32, can be easily understood from Figs. 7 through 7B.

In Fig. 7, adjusting ring 32 arbitrarily is positioned rotatively so that the "high part" of that ring (i. e., that part having the greatest cross-sectional dimension) is toward the reader and so that, therefore, the "low part" of the ring (i. e., that part having the least cross-sectional dimension) is away from the reader. At such time, shoes 35 and 36 in the gimbal tube's flange 55 are in contact with the ring's end face 43 at diametrically opposite places, but the mean thickness of the ring at those places is substantially identical, assuming the high part of the ring to be midway between the left and right sides of the ring. Therefore, gimbal tube ring 34 and the telescope therein extend in a direction from top to bottom, or vice versa, of the drawing sheet and are in the medial position of adjustment in azimuth.

In Fig. 7A, adjusting ring 32 has been rotated so that the "high part" of that ring is toward the right in that figure and so that, therefore, the "low part" of the ring is toward the left. As a result of this condition, gimbal tube 34 has, through the action of that ring's end face 43 on shoes 35 and 36 in the gimbal tube's flange, been rocked about the arcuate portions of shoes 35A and 36A (one of which shoes is shown) so that the gimbal tube and the telescope therein are inclined somewhat toward the left of the drawing sheet and are in one extreme position of adjustment in azimuth.

Adjusting the position of the sighting telescope in elevation

There are times when it is desirable to adjust in elevation the position of the sighting telescope. This is done to move the telescope's sighting reticle (not shown) into a certain desired relationship in elevation with the image (not shown) of a target, as may be necessary during bore-sighting, or during use of the recoilless rifle.

In order to adjust the position of the sighting telescope in elevation, adjusting worm 33A (Fig. 5), which worm is designated by the letters "EL" (Fig. 5) formed in convenient manner on the housing's arm 26 near that screw's head, is rotated in the direction and in the amount required. Inasmuch as the threaded body portion (not shown) of that worm is in mating engagement with worm gear teeth 40A (Figs. 6 and 7) formed in adjusting ring 32A, that ring is rotated correspondingly.

As adjusting ring 32A is so rotated, end face 43A (Figs. 6, 6A, 7 and 7A) of that ring, which end face, as stated, is inclined with respect to that ring's opposite end face 42A, acts on shoes 35A and 36A (Figs. 6 through 6B) to pivot gimbal tube 34 about the arcuate portions of shoes 35 and 36 (one of which shoes is shown in Figs. 6 and 6A and both of which shoes are shown in Figs. 7 and 7A) and, thereby, to change the position of gimbal tube 34 in elevation (i. e., in a direction from top to bottom, or vice versa, of the drawing sheet in Figs. 6 through 6B); the amount and direction of such movement depending upon the amount and direction of the adjusting worm's and the adjusting ring's rotation. Of course, as the position of the gimbal tube is so changed, the position of the sighting telescope in the gimbal tube is changed accordingly.

The just-stated movement of gimbal tube 34, in consequence of rotation of adjusting worm 33A and attendant rotation of adjusting ring 32A can be easily understood from Figs. 6 through 6B.

In Fig. 6, adjusting ring 32A arbitrarily is positioned rotatively in housing 21 so that the "high part" of that ring is toward the reader and so that, therefore, the "low part" of that ring is away from the reader. At such time, shoes 35A and 36A in the gimbal tube's flange 55 are assuming the ring's high and low parts to be midway between the upper and lower boundaries of the ring, in contact with the ring's end face 43A at diametrically opposed places, but the mean thickness of the ring at those places would be substantially identical. Therefore, gimbal tube 34 extends in a direction from left to right, or vice versa, of the drawing sheet in that figure and is in the medial position of adjustment in elevation. Likewise, the telescope positioned in the gimbal tube is also in the medial position of adjustment in elevation.

In Fig. 6A, adjusting ring 32A has been rotated so that the high part of that ring is toward the bottom of the drawing sheet and so that, therefore, the low part of the ring is toward the bottom of the drawing sheet. As a result of this condition, gimbal tube 34 has, through the action of the adjusting ring's inclined end face on shoes 35A and 36A, been moved pivotally about the arcuate portions of shoes 35 and 36 (one of which is shown in Figs. 6 and 6A) so that the gimbal tube is inclined upwardly with respect to the position referred to in connection with Figs. 6 and 6A and is in the other extreme position of adjustment in elevation.

Releasing the interlocking engagement between the telescope and the support's gimbal tube In order to release the interlocking engagement, earlier explained, between the telescope and the support's gimbal tube 34, so that the telescope can be separated from the gimbal tube, and thereby separated from the support, sleeve 113 (Figs. 1, 6, 6A, 7, 7A, 9 and 9B through 16) is rotated in a counterclockwise direction, as viewed in Figs. 12, 14 and 16, relative to the telescope's second housing 101. During such rotation, sleeve 113, by virtue of the earlier stated threaded engagement with the telescope's first housing 100 (Fig. 11), is also moved in a rectilinear direction away from that end of the gimbal tube which is proximal to the sleeve. Inasmuch as ring 116 (Figs. 1, 6, 6A, 7, 7A, 9, 9B through 9D, 10, 11 and 16) is retained on sleeve 113 by virtue of clutch spring 119 (Figs. 11 and 16), as earlier explained, that ring is moved in the same rectilinear direction as the sleeve; the ring, for the present, being prevented from rotating because of the interlocking engagement between its locking projections and the gimbal tube's locking grooves. As a result of the ring's rectilinear movement, that ring's locking projections are withdrawn from the gimbal tube's locking grooves; one of the ring's locking projections being withdrawn from that locking groove on gimbal tube 34 which is formed by steps 93 and 95 and by area 89, and the other of the ring's locking projections being similarly withdrawn from the gimbal tube's other locking groove, which groove, as stated, is formed by steps 94 and 96 and by area 90. As soon as the ring's locking projections are "clear," to use a common expression, of steps 93 and 94, as shown for step 93 in Fig. 13A, ring 116, through the agency of clutch spring 119, is able to rotate along with sleeve 113. Therefore, upon continued rotation of the sleeve, ring 116 is also rotated along with the sleeve so that one side of one of the ring's locking projections is carried into abutment with the gimbal tube's step 91 (Figs. 14 and 15) and into alignment with one of the gimbal tube's grooves 61 (Fig. 14); and so that the ring's other locking projection is carried into abutment with the gimbal tube's step 92 (Fig. 14) and into alignment with the gimbal tube's other groove 61.

Thus, the interlocking engagement between the ring's locking projections and the support's gimbal tube is released. Therefore, the telescope now can be removed from the gimbal tube and from the support. This removal is merely a matter of pulling the telescope from the gimbal tube in a direction opposite to that required in inserting the telescope as was earlier explained. As the telescope is so removed from the gimbal tube, locking projections 117 on the telescope's ring 116 move along respective grooves 61 formed in the gimbal tube's longitudinally extending opening.

From the explanation just made, it is readily appreciated that the telescope and the support may be separated from each other quickly and easily.

SUMMARY

From the foregoing, it is evident that I have provided a simply constructed, rugged and durable support in which: the position of the member supported therein is adjustable in two imaginary planes substantially perpendicular to each other; the position of the object supported thereby need not necessarily be adjustable, but in which the supported object is releasably interlocked with the support; the position of the object supported thereby is adjustable and in which the supported object is releasably interlocked with the support; and the means for adjusting the position of the object supported is self-locking. It should further be evident that I have provided: an object to be supported, which object is adapted in novel manner to releasably interlock with the support; a support, adapted to releasably interlock with the object supported thereby, but not necessarily equipped with means for adjusting the position of the supported object, in combination with a supported object adapted to releasably interlock with the support; and a support, equipped with means for adjusting the position of the object supported thereby and adapted to releasably interlock with the supported object, in combination with a supported object adapted to releasably interlock with the support.

My primary objective for my invention was to incorporate it in a support and in an object supported thereby so that the support and the object supported are releasably interlockable together, as explained, and further so that the position of the object supported is adjustable in two, intersecting, perpendicular planes, as also explained.

However, it will be obvious that the manner of interlocking the support and the object supported thereby, as taught by my invention, may be utilized in a support provided with some known, convenient manner of adjusting that position of the object supported; and, also, that the manner of adjusting the position of the object supported by the support, as taught by my invention, may be utilized in a support provided with a known, convenient manner of releasably interlocking together the support and the object supported thereby.

It is also obvious that my invention is readily amenable to numerous modifications and variations, by those of ordinary skill, without departing from the original spirit and scope thereof as exemplified in the embodiment disclosed herein solely for illustrative purposes. In view of the foregoing specification, it does not seem necessary to treat such modifications and variations in detail. However, by way of example, I shall briefly mention some of the numerous modifications and variations of which my invention is readily susceptible.

As to housing 21, that housing could be made so that the end to end opening therethrough has substantially the same shape longitudinally as that, shown in Figs. 4 and 6 through 7B, resulting from the housing and cap ring 37 joined thereto. In such case, the cap ring could be eliminated and sealing ring 39 could be positioned in the housing in a manner similar to sealing rings 38 (Figs. 6 and 7). Also, in such case, the housing could be made in two or more longitudinal sections joined in convenient manner along the length of the housing; or the housing could be made in two or more ring shaped sections joined in convenient manner around the circumference of those sections.

Additionally, as to housing 21, that housing could be made with only one opening thereinto for applications of the invention where it is not necessary to have the object carried by the support extend through the housing. In such cases, the housing's annular shoulder 24 (Figs. 6 and 7) may be extended radially inwardly so as to form an intermediate, flat, interior surface inside the housing.

Of course, too, in some applications of the invention, the housing could be made without arms 26 and 27 (Figs. 2 through 4 and 8) and without band 30 (Figs. 1, 2 and 4); or could be made with one or more arms, but without a band; or could be made with one or more bands, but with no arm or arms.

As to the housing's annular shoulder 24 (Figs. 6 and 7) that shoulder could be dispensed with and some other means could easily be provided for abutment with adjusting ring 32. That shoulder, instead of being substantially perpendicular to the axis of the housing's longitudinally extending opening, may be inclined relative to that axis. Furthermore, that shoulder, instead of being flat, as shown in Figs. 6 and 7, could be a spherical or a tapered surface; in which case, end face 42 (Figs. 6 and 6A) of adjusting ring 32 could be shaped accordingly.

In some applications of the invention in which there is no need for adjusting the position of the object supported by the support, but in which there is need for a support which is releasably interlockable with the object carried by the support, adjusting rings 32 and 32A (Figs. 4, 6 and 7), adjusting worms 33 and 33A (Fig. 5), gimbal tube 34 (Figs. 4, 6 and 7), shoes 35 and 36 (Figs. 7 and 7A) and 35A and 36A (Figs. 6 through 6B) could be dispensed with and the housing could be made to receive the object to be supported and could also be made, as explained for the one end of the gimbal tube, so as to be releasably interlockable with the object to be supported; that object also being made so as to be releasably interlockable with the housing.

As for adjusting ring 32 and 32A (Figs. 4 and 6 through 7A), the lateral surfaces of those rings, instead of being provided with the worm gear teeth shown, could be provided with gear teeth of other known form; and rotation of the adjusting rings, instead of being effected by rotation of adjusting worms 33 and 33A, respectively (Fig. 5), as explained, could be effected by rotation of one, or more, gears entrained with the adjusting rings.

Also, those adjusting rings, instead of being provided with worm gear teeth and being rotated through the agency of the adjusting worms, could be provided with radially projecting arms which extend through slots in the circumferential surface of housing 21; the rings being rotatable by application of a torque to the arms.

Additionally, as to adjusting rings 32 and 32A, in some embodiments of the invention, it may be necessary to have the gimbal tube adjustable in only one plane, instead of in two, intersecting, perpendicular planes. In such cases, one adjusting ring and the respective adjusting worm therefor could be omitted.

Furthermore, in some applications of the invention, where it is necessary to have a support for a rotating object (e. g., a shaft), where it is also necessary to have the support and the object supported releasably interlockable with each other, but where it is not necessary to have the position of the object supported adjustably, as stated from the earlier named sighting telescope, adjusting rings 32 and 32A (Figs. 4 and 6 through 7A) could be replaced by bearing members, which members could be made so that they support gimbal tube 34 for rotation about its own axis in housing 21. In such cases, adjusting rings 32 and 32A (Fig. 4), adjusting worms 33 and 33A (Fig. 5), shoes 35 and 36 (Figs. 7 and 7A), shoes 35A and 36A (Figs. 6 through 6B), and pin 59 (Fig. 4) would not be necessary. Also, inasmuch as the position of the gimbal tube would not be adjustable, rim 56 (Figs. 6 through 6B) of that tube's flange 55 need not be spherical, but may be of cylindrical or other shape.

As to gimbal tube 34 (Figs. 4 and 6 through 7B), one face of that tube's flange, instead of being provided with a pair of shoes 35 and 36 as shown and described, could be provided with a pair of projections which were integral with the flange and which were shaped upon their off-set surfaces so as to allow for adjusting the position of the gimbal tube as stated; and the other face of that tube's flange could be provided with a similar pair of projections, positioned as shown and described for the other pair of shoes. In such cases, shoes 35, 36, 35A and 36A, therefore, could be eliminated.

Also, the longitudinally extending opening in gimbal tube could be of substantially constant cross-sectional dimension along its length (e. g., triangular, cylindrical, quadrilateral, or polygonal). In which case, the object to be positioned inside the gimbal tube would be shaped accordingly in cross-section, and the insertion into the gimbal tube of the object to be supported could be limited, as by a flange, or other projection, provided on the object to be supported.

In some applications of the invention, the rim of the gimbal tube's flange, instead of being an equatorial zone of the sphere, as explained, may be a non-equatorial zone, which zone could abut a similarly shaped seat provided inside the housing. Correlatively, in some applications of the invention, the rim of the gimbal tube's flange may be cylindrical or conical.

In some applications of the invention, the object received and supported by the gimbal tube could be rotatable in that tube and the position of the gimbal tube and of the object therein could be adjustable, as explained for the telescope. However, in such cases, the gimbal tube and the object supported by the support need not be made, as explained herein, as to be releasably interlockable with each other.

In some applications of the invention, pin 59 (Fig. 4) could be dispensed with and the gimbal tube 34 could be supported for rotation in the housing; that tube still being made so as to be interlockable with the object to be supported. In such cases, there need be no provision for adjusting the position of the gimbal tube. Therefore, adjusting rings 32 and 32A, adjusting worms 33 and 33A, and shoes 35, 36, 35A and 36A could be dispensed with, as earlier stated.

In some applications of the invention, gimbal tube 34 could be replaced by a member, which I shall call a gimbal member, which member would be substantially identical to the gimbal tube, except that the gimbal member could either be solid (e. g., without an opening extending longitudinally therethrough) so that the object to be supported rested upon or was attached, in some convenient manner, to the gimbal member; or the gimbal member could be provided with an opening which extended part way through that member so that the gimbal member could act as a socket for receiving the object to be supported. In such cases, the gimbal member need not be made, as explained, to releasably interlock with the object supported thereby.

In some applications of the invention, gimbal tube 34 could be replaced by a member, which I shall call a tubular member, the position of which member need not be adjustable, as explained for gimbal tube 34. In such cases, the tubular member could be made, as explained for the gimbal tube, so as to be releasably interlockable with the object to be supported; and such tubular member could either be supported for rotation about its own axis in the housing or be secured against such rotation, as desired.

As for shoes 35 and 36 (Figs. 7 and 7A), and 35A and 36A (Figs. 6 through 6B), in some applications of the invention where adjustment of gimbal tube 34 in only one plane is necessary, instead of adjustment in two, intersecting, perpendicular planes, shoes 35 and 36 may abut annular shoulder 24 (Figs. 6 and 7) of housing 21, instead of abutting adjusting ring 32, which ring and adjusting worm 33 (Figs. 2, 5 and 8) therefore could be eliminated; or shoes 35A and 36A could abut the inner end of cap ring 37, instead of abutting adjusting ring 32A, which ring and adjusting worm 33A (Figs. 3 and 5) therefore could be eliminated, depending upon in which one of the two, intersecting, perpendicular planes adjustment is necessary.

Also, as to shoes 35, 36, 35A and 36A, it is apparent, from the statement just made, that, in some applications of the invention, shoes 35 and 36 may be integral with the housing's shoulder 24; and, similarly, that shoes 35A and 36A may be integral with the inner end of cap ring 37.

As to cap ring 37 (Figs. 1, 3 through 7 and 7B), it was earlier explained how that ring could be eliminated by so making housing 21 that the housing's end to end opening has substantially the same shape, shown in Figs. 4, 6 through 7 and 7B, as provided by the housing with the cap ring joined thereto; and it was also earlier explained that sealing ring 39 (Figs. 4, 6, 7 and 7B) could be accommodated in housing 21.

Also, as to cap ring 37, in some embodiments of the invention wherein the position of the object supported need not be adjustable, as explained for the sighting telescope, but wherein the support and the object are to be releasably interlockable together, the outer end of the cap ring could be made, as explained for the one end of gimbal tube 34, so as to be releasably interlockable with the object to be supported. In such instances, adjusting rings 32 and 32A, adjusting worms 33 and 33A, gimbal tube 34, and shoes 35, 36, 35A and 36A could be omitted.

As to first housing 100 (Figs. 1, 6, 7, 7A, 9 through 9D and 11), that housing, instead of being prevented from rotating in gimbal tube 34 by pin 126 (Figs. 2, 6B, 7, 7A, 9A, 9B and 16) which engages recess 127 (Figs. 9A, 10 and 11) in that housing, could be prevented from rotating in the gimbal tube by a projection on the first housing, which projection could fit into engagement with a recess on the inside of the gimbal tube.

As to joining first and second housings 100 and 101 (Fig. 11), those housings, instead of being joined integrally with each other, as shown and described, could be so joined together that they are detachable from each other at any time.

As to sleeve 113 (Fig. 11), that sleeve, instead of being in threaded engagement with first housing 100 as shown in the just-named figure, could be in threaded engagement with shank portion 111 of second housing 101. This could be done by dispensing with the threaded end 124 of that sleeve and threading the inside of the sleeve and the outside of the shank portion.

As to ring 116 (Fig. 11), that ring, instead of being retained on sleeve 113 by means of clutch spring 119, as shown and described, could be retained on the sleeve, as by a set screw, the inner end of which could project into a groove formed in the circumferential surface of the sleeve.

Also, as to ring 116, that ring could be provided with any convenient member of locking projection 117 (Figs. 9C, 9D, 10, 12 and 14); each projection to be engageable with a locking groove in the support.

As to clutch spring 119 (Figs. 11 and 16), that spring could be replaced by a ring type, yieldable clutch member positioned between shoulder 115 (Fig. 11) of sleeve 113 and that end of ring 116 proximal to that shoulder.

Thus, it is easily understandable that my invention is readily amenable to numerous modifications and variations, by those of ordinary skill, without departing from the spirit and scope of my original concept; and that my invention is extendable far beyond the boundaries inherent in the earlier described illustrative embodiment.

For those reasons and because the principles my invention can be used in supports for any one of a multiplicity of diverse objects (e. g., shafting, platforms for cameras and for instruments and the like), in addition to the use described in the illustrative embodiment, I do not wish my invention to be limited in patent coverage by the comparatively narrow confines inherent in the embodiment described in the foregoing specification and shown in the accompanying drawings. Instead, I wish my invention to be limited only by the metes and bounds of the appended claims.

I claim:

1. A support in which the position of the object supported thereby is selectively adjustable in an imaginary plane, such support comprising: a housing having an opening thereinto and having a flat, interior surface which faces that opening; a cap ring attached to said housing at the named opening thereinto so that the inner end of said cap ring is in spaced, substantially parallel relationship to said housing's flat, interior surface; a gimbal member for supporting the object to be supported by the support, said gimbal member having an annular flange the rim of which forms a portion of a spherical surface generated from a point on said gimbal member's axis, one face of said gimbal member's flange having a pair of projections which are positioned in a substantially diametrically opposed relationship to each other and the other face of said gimbal member's flange having another pair of projections which are positioned in substantially diametrical opposition to each other and which, further, are positioned substantially perpendicularly to the projections on the flange's other face, said gimbal member being positioned in said housing in alignment with said cap ring, with the gimbal member's flange disposed between the housing's flat, interior surface and said cap ring's inner end, said gimbal member being prevented from rotating about its own axis in said housing, and said gimbal member being supported at the rim of its flange by said housing so that the position of the gimbal member is adjustable in an imaginary plane which passes through the gimbal member's axis; and an adjusting ring having one of its end surfaces inclined with reference to its other end surface, said adjusting ring being positioned in said housing around said gimbal member with one of the ring's end surfaces in abutment with said housing's flat, interior surface and with that ring's other end surface in abutment with one of said pairs of projections on said gimbal member's flange, said adjusting ring being supported by said housing for selective rotation about said gimbal member for the purpose of adjusting the gimbal member's position as stated, thereby providing for adjusting the position of the object supported by that member accordingly.

2. The support of claim 1 in which the adjusting ring is provided with worm gear teeth, and means in engagement with said gear teeth and operative to effect selective rotation of the adjusting ring.

3. A support in which the position of the object supported thereby is selectively adjustable in an imaginary plane, such support comprising: a housing having an opening thereinto and having a flat, interior surface which faces that opening; a cap ring attached to said housing at the named opening thereinto so that the inner end of said cap ring opening thereinto so that the inner end of said cap ring is in spaced, substantially parallel relationship to said housing's flat, interior surface; a gimbal member for supporting the object to be supported by the support, said gimbal member having an annular flange the rim of which faces a portion of a spherical surface generated from a point of said gimbal member's axis, said gimbal member being positioned in said housing in alignment with said cap ring and with the gimbal member's flange disposed between the housing's flat, interior surface and said cap ring's inner end, said gimbal member being prevented from rotating about its own axis in said housing, and said gimbal member being supported at the rim of its flange by said housing so that the position of the gimbal member is selectively adjustable in an imaginary plane which passes through that member's axis; a first pair of shoes, the lateral surface of each shoe of said first pair comprising an arcuate portion and a flat portion, said first pair of shoes being positioned in one face of said gimbal member's flange in substantially diametrical opposition to each other with the arcuate portions of the lateral surfaces of said first shoes accommodated partly in the flange's one face and with the flat portions of those lateral surfaces off-set from that face, a first adjusting ring having one of its end surfaces inclined with reference to its other end surface and positioned in said housing around said gimbal member with one of its end surfaces in abutment with said end cap and the other of its end surfaces in abutment with the flat portions of the lateral surfaces of said first pair of shoes; a second pair of shoes, the lateral surface of each shoe of said second pair comprising an arcuate portion and a flat portion, said second pair of shoes being positioned in the other face of said gimbal member's flange in substantially diametrical opposition to each other and also substantially perpendicularly to said first pair of shoes, said second pair of shoes being positioned with the arcuate portions of the lateral surface of those shoes accommodated partly in the flange's named face and with the flat portions of those lateral surfaces off-set from that face; and an adjusting ring having one of its end surfaces inclined with reference to its other end surface, said second adjusting ring being positioned in said housing around said gimbal member with one of the ring's end surfaces in abutment with said housing's flat, interior surface and with that ring's other end surface in abutment with the flat portions of the lateral surfaces of said second pair of shoes, said second adjusting ring being supported by said housing for selective rotation about said gimbal member for the purpose of adjusting the position of the gimbal member, about said first pair of shoes, in an imaginary plane which passes through that member's axis, thereby providing for adjusting the position of the object supported by that member correspondingly.

4. A support comprising: a housing having an opening thereinto and having a flat, interior surface which faces that opening; a cap ring attached to said housing at the named opening thereinto so that the inner end of said cap ring is in spaced, substantially parallel relationship to said housing's flat, interior surface; a gimbal member for supporting an object to be supported by the support, said gimbal member having an annular flange the rim of which forms a portion of a spherical surface generated from a point of said gimbal member's axis, said gimbal member being positioned in said housing in alignment with said cap ring, said gimbal member being supported at the rim of its flange by said housing; a first pair of shoes, the lateral surface of each shoe of said first pair comprising an arcuate and a flat portion, said first pair of shoes being positioned in one face of said gimbal member's flange in substantially diametrical opposition to each other with the arcuate portions of the lateral surfaces of said first shoes accommodated partly in the flange's one face and with the flat portions of the lateral surfaces of said first shoes off-set from that face and, at the same time, facing toward the inner end of said cap ring; a second pair of shoes, the lateral surface of each shoe of said second pair comprising an arcuate and a flat portion, said second pair of shoes being positioned in the other face of said gimbal member's flange in substantially diametrical opposition to each other and also substantially perpendicularly to said first pair of shoes, said second pair of shoes being positioned with the arcuate portions of the lateral surfaces of those shoes accommodated partly in the flange's named face and with the flat portions of the lateral surfaces of said second pair of shoes off-set from that face; a pin in said housing, said pin extending into engagement with said gimbal member's flange and serving to prevent the gimbal member from rotating about its own axis in the housing but yet allowing the position of said gimbal member to be changed, about said first pair of shoes, in an imaginary plane which passes through the gimbal member's axis; an adjusting ring having one of its end surfaces inclined relative to its other end surface, the circumferential surface of said adjusting ring being provided with worm gear teeth, said adjusting ring being positioned in said housing around said gimbal member with one of that ring's end surfaces in abutment with said housing's flat, interior surface and with that ring's other end surface in abutment with the flat portions of the lateral surfaces of said second pair of shoes, said adjusting ring being supported by said housing for selective rotation about said gimbal member for the purpose of changing the position of the gimbal member as stated; an adjusting worm, said worm being positioned in said housing in mating engagement with said adjusting ring's worm gear teeth, said worm being rotatable for the purpose of rotating said adjusting ring; a pin in said housing and in mating engagement with said adjusting worm so as to retain that worm in said housing but yet allow selective rotation of that worm; and a ring between said cap ring and said gimbal member for sealing the space therebetween but yet allowing the position of the gimbal member to be changed as stated.

5. In a support wherein the position of the object supported thereby is adjustable in two imaginary, intersecting planes substantially perpendicular to each other, the combination of: a housing having an opening thereinto and having a flat, interior surface which faces toward that opening; a cap ring attached to said housing at that housing's opening, the inner end of said cap ring effectively forming an annular shoulder inside said housing, which shoulder faces the housing's interior surface and is in spaced, substantially parallel relationship thereto; a gimbal member for supporting the object to be supported by the support, said gimbal member having an annular flange the rim of which forms a portion of a spherical surface generated from a point on said gimbal member's axis, one face of said gimbal member's flange having a pair of projections which are located in substantially diametrical opposition to each other and the other face of said gimbal member's flange having a pair of projections which are located in substantially diametrical opposition to each other and which, further, are located substantially perpendicular to the projections on the flange's other face, said gimbal member being positioned in said housing with the gimbal member's flange disposed between said housing's flat, interior surface and said cap ring's inner end and with one end of the gimbal member extending into said cap ring's opening, said gimbal member being supported at the rim of its flange by said housing so that the gimbal member is prevented from rotating in the housing about the gimbal member's axis but so that the position of said gimbal member is changeable in two imaginary planes which pass through the gimbal member's axis substantially perpendicular to each other; a first adjusting ring having one of its end surfaces inclined with reference to its other end surface, said first adjusting ring being positioned in said housing around said gimbal member with one of the ring's end surfaces in abutment with said housing's flat, interior surface and with the ring's other end surface in abutment with one pair of projections on said gimbal member's flange, said first adjusting ring being supported for selective rotation by said housing; and a second adjusting ring having one of its end surfaces inclined with reference to its other end surface, said second adjusting ring being positioned in said housing around said gimbal member with one of the ring's end surfaces in abutment with said cap ring's inner end and with that ring's other end surface in abutment with the other pair of projections on said gimbal member's flange, said second adjusting ring being supported for selective rotation by said housing; whereby, upon rotation of said first adjusting ring, the position of said gimbal member is changed, about one pair of projections on that member's flange, in an imaginary plane which passes through the gimbal member's axis, thereby providing for changing the position of the object supported by said gimbal member accordingly; and whereby, upon rotation of said second adjusting ring, the position of said gimbal member is changed, about the other pair of projections on that member's flange, in an imaginary plane which passes through the gimbal member's axis substantially perpendicular to the first named imaginary plane, thus providing for changing the position of the object supported by said gimbal member accordingly.

6. A support wherein the position of the object supported thereby is adjustable in an imaginary plane, such support comprising: a housing having an opening thereinto, having a cap with an annular shoulder which encircles the inner end of that opening and which faces toward the inside of said housing, and having a flat interior surface which is in spaced, substantially parallel relationship to said annular shoulder; a gimbal member for supporting the object to be supported by the support, said gimbal member having an annular flange the rim of which forms a portion of a spherical surface generated from a center which lies on said gimbal member's axis, one face of said gimbal member's flange having a pair of projections which are positioned substantially diametrically opposed to each other and the other face of said gimbal member's flange having another pair of projections which are positioned substantially diametrically opposed to each other and which, further, are positioned substantially perpendicularly to the projections on the flange's other face, said gimbal member being positioned in said housing with one pair of projections on said gimbal member's flange facing said annular shoulder, said gimbal member being prevented from rotating about its own axis in said housing and said gimbal member being supported at the rim of its flange by said housing so that the position of said gimbal member is adjustable, about that pair of projections in abutment with said housing's shoulder, in an imaginary plane which passes through that member's axis; and an adjusting ring having one of its end surfaces inclined with reference to its other end surface, said adjusting ring being positioned in said housing around said gimbal member with one of the ring's end surfaces in abutment with said housing's flat, interior surface and with the other of the ring's end surfaces in abutment with the other pair of projections on said gimbal member's flange, said adjusting ring being supported by said housing for selective rotation about said gimbal member for the purpose of changing the gimbal member's position as stated, thereby providing for adjusting the position of the object supported by that member accordingly.

7. In a support wherein the position of the object supported thereby is adjustable in an imaginary plane, the combination of: a housing having first and second coaxial openings thereinto, and having first and second annular shoulders, the first shoulder encircling the inner end of the first opening and facing toward the second opening and the second shoulder encircling the inner end of the second opening so as to face toward and so as to be in spaced, parallel relationship to said housing's first shoulder; a gimbal tube for receiving and supporting the object to be supported by the support, said gimbal tube having an annular flange the rim of which forms a portion of a spherical surface generated about a center which lies on said gimbal tube's axis, one face of said gimbal tube's flange having a pair of projections which are positioned in substantially diametrical opposition to each other, and the other face of said gimbal tube's flange having another pair of projections which are positioned in substantially diametrical opposition to each other and which, further, are positioned substantially perpendicularly to the projections on the flange's other face, said gimbal tube being positioned in said housing in alignment with that housing's coaxial openings with one pair of projections on said gimbal tube's flange facing toward one of said housing's shoulders, said gimbal tube being prevented from rotating about its own axis in said housing, and said gimbal tube being supported at the rim of its flange by said housing so that the position of said gimbal tube is adjustable, about that pair of projections facing toward the housing's annular shoulder, in an imaginary plane which passes through the gimbal tube's axis; and an adjusting ring having one of its end surfaces inclined with reference to its other end surface, said adjusting ring being positioned in said housing around said gimbal tube with one of the ring's end surfaces in abutment with the other one of said housing's shoulders and with the other of the ring's end surfaces in abutment with the other pair of projections on said gimbal tube's flange, said adjusting ring being supported by said housing for selective rotation; whereby, upon rotation of said adjusting ring, the position of said gimbal tube is changed as stated in said housing, thus providing for changing the position of the object received and supported by that tube accordingly.

8. A shaft-like object made to releasably interlock with a support having at one of its ends a pair of extensions, such object comprising: an elongated member having a first portion shaped so as to be passable through the support and so as to be extendable therebeyond, and having a second portion shaped so as to be insertable a limited amount into the support; a sleeve encircling part of said elongated member's first portion, said sleeve being in threaded engagement with said elongated member and being rotatable thereon so that, upon being so rotated, said sleeve is moved rectilinearly along said elongated member relative to that member's second portion; and a ring having at least one locking projection for releasably interlocking with the support, said ring encircling part of said sleeve and being retained thereon so as to be rotatable relative thereto, and said ring being yieldably coupled to said sleeve so that, said ring is rotatable with said sleeve until said locking projection engages said extension whereafter said locking projection is moved along said extension to interlock the shaft-like object with the support; and whereby, after being so interlocked, said sleeve is rotated in the opposite direction to release said ring's projection from the support, thereby to release the interlocking engagement between the shaft-like object and the support.

9. A shaft-like object made to releasably interlock with a support having at one of its ends two pairs of extensions each differently spaced from the opposite end of said support, such object comprising: an elongated member having a first portion shaped so as to be passable through the support and so as to be extendable therebeyond, and having a second portion shaped so as to be insertable a limited amount into the support; a sleeve encircling part of said elongated member's first portion, said sleeve being in threaded engagement with said elongated member and being rotatable thereon so that, upon being so rotated, said sleeve is moved rectilinearly along said elongated member relative to that member's second portion; a ring, means between said sleeve and said ring for retaining these elements in assembled relationship to each other, said ring having at least one locking projection for releasably interlocking with the support, said ring encircling part of said sleeve and said ring being yieldably coupled to that sleeve so that, said ring is rotatable with said sleeve to bring said locking projection into engagement with longest of said extension and whereafter said locking projection is moved along said longest projection to interlock said ring's projection with the support, thereby to interlock the shaft-like object with the support; and whereby, following such interlocking, said sleeve is rotated in the opposite direction into engagement with said longest extension to release said ring's projection from the support, thereby to release the interlocking engagement between the shaft-like object and the support.

10. A shaft-like object made to releasably interlock with a support having at one of its ends two pairs of extensions each differently spaced from the opposite end of said support, such object comprising: an elongated member having a first portion shaped so as to be passable through the support and so as to be extendable therebeyond, and having a second portion shaped so as to be insertable a limited amount into the support; a sleeve encircling part of said elongated member's first portion, said sleeve being in threaded engagement with said elongated member and being rotatable thereon so that, upon being so rotated, said sleeve is moved rectilinearly along said elongated member relative to that member's second portion; a ring having at least one locking projection for releasably interlocking with the support, said ring encircling part of said sleeve and being retained thereon so as to be rotatable relative thereto; and means between said sleeve and said ring for coupling those elements to each other so that said ring is rotatable in unison with said sleeve when said locking projection clears said longest extension and so that said sleeve is rotatable relative to said ring when said locking projection engages said longest extension; whereby, after insertion of the shaft-like object into the support, said sleeve is rotated in one direction to interlock said ring's projection with the support, thereby to interlock the shaft-like object with the support; and whereby, subsequent to such interlocking, said sleeve is rotated in the opposite direction to release said ring's projection from the support, thereby to release the interlocking engagement between the shaft-like object and the support.

11. A shaft-like object adapted to releasably interlock with a support having at one of its ends a pair of extensions, such object comprising: an elongated member having a first portion shaped so as to be passable through the support and so as to be extendable therebeyond, and having a second portion shaped so as to be insertable a limited amount into the support; a sleeve encircling part of said elongated member's first portion, said sleeve being in threaded engagement with said elongated member and being rotatable thereon so that, upon being so rotated, said sleeve is moved rectilinearly along said elongated member relative to that member's second portion; a ring having at least one locking projection for releasably interlocking with the support, said ring encircling part of said sleeve and being rotatable thereon; and an undulating spring between said sleeve and said ring for both retaining those elements in assembled relationship to each other and also for coupling the sleeve and the ring to each other so that, when one of said extensions does not abut said ring's projection, said sleeve and said ring are rotatable in unison with each other as one or the other of those elements is rotated, and so that, when said one of said extensions abuts said ring's projection, said spring is yieldable so that said sleeve is rotatable relative to said ring; whereby, after insertion of the shaft-like object into the support, said sleeve is rotated in one direction to interlock said ring's projection with the support, thereby to interlock the shaft-like object with the support; and whereby, subsequent to such interlocking, said sleeve is rotated in the opposite direction to release said ring's projection from the support, thereby to release the interlocking engagement between the shaft-like object and the support.

12. The combination, in a telescope made so as to be releasably interlockable with a support having at one of its ends a pair of extensions, of: a first housing which contains some of the components making up the telescope's optical system; a second housing which contains the remainder of the components making up the telescope's optical system, said second housing being joined to said first housing and being shaped so as to be insertable a limited amount into the support; a sleeve encircling part of said first housing and being rotatable thereon, said sleeve being in threaded engagement with said second housing so that, upon being so rotated, said sleeve is movable rectilinearly along said first housing relative to said second housing; and a ring having at least one locking projection for releasably interlocking with the support, said ring encircling part of said sleeve and being retained thereon so as to be rotatable relative thereto, and said ring being yieldably coupled to said sleeve so that it is rotatable in unison with said sleeve when said one of said extensions and said locking projection are disengaged and so that said sleeve is rotatable relative to said ring when said locking projection engages said one of said extensions; whereby, after insertion of the telescope into the support, said sleeve is rotated in one direction to interlock said ring's projection with the support, thereby to interlock the telescope with the support; and whereby, subsequent to such interlocking, said sleeve is rotated in the opposite direction to release said ring's projection from the support, thereby to release the interlocking engagement between the telescope and the support.

13. A combination according to claim 1 wherein a second adjusting ring is similarly disposed in said housing with its inclined face in engagement with the other pair of said projections.

References Cited in the file of this patent

UNITED STATES PATENTS

| 449,958 | Simonds | Apr. 7, 1891 |
| 1,783,410 | Cowell | Dec. 2, 1930 |
| 2,125,932 | Lennon | Aug. 9, 1938 |